United States Patent
Hashimoto

(10) Patent No.: US 8,898,534 B2
(45) Date of Patent: *Nov. 25, 2014

(54) DATA TRANSFER METHOD

(71) Applicant: Fujitsu Limited, Kawasaki-shi, Kanagawa (JP)

(72) Inventor: Masanori Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/654,941

(22) Filed: Oct. 18, 2012

(65) Prior Publication Data
US 2013/0044584 A1    Feb. 21, 2013

Related U.S. Application Data

(60) Division of application No. 12/416,828, filed on Apr. 1, 2009, which is a continuation of application No. PCT/JP2006/319835, filed on Oct. 4, 2006.

(51) Int. Cl.
*G06F 11/00* (2006.01)
*H04L 1/18* (2006.01)
*H04L 1/16* (2006.01)
*H04L 1/12* (2006.01)
*H04W 28/04* (2009.01)
*H04W 36/00* (2009.01)

(52) U.S. Cl.
CPC ............ *H04L 1/1848* (2013.01); *H04L 1/1642* (2013.01); *H04L 1/187* (2013.01); *H04L 1/1874* (2013.01); *H04L 2001/125* (2013.01); *H04W 28/04* (2013.01); *H04W 36/00* (2013.01)
USPC ............................ 714/749; 714/748; 714/746

(58) Field of Classification Search
USPC .................................................. 714/748, 749
See application file for complete search history.

(56) References Cited

U.S. PATENT DOCUMENTS 6,269,080 B1   7/2001   Kumar
6,424,625 B1   7/2002   Larsson et al.
(Continued)

FOREIGN PATENT DOCUMENTS

EP    0964544 A1    12/1999
EP    1526673 A1    4/2005
JP    200059347     2/2000

OTHER PUBLICATIONS

Masaki Kobayashi et al., "Musen Lan Network ni Okeru Handoff ni Taisuru TCP Tsushin Kosokuka Shuho", IEICE Technical Report NS2004-79, The Institute of Electronics, Information and Communication Engineers, vol. 104, No. 184, pp. 51 to 54, sections 2,3 dated Jul. 9, 2004.

(Continued)

*Primary Examiner* — Sarai Butler
(74) *Attorney, Agent, or Firm* — Smith, Gambrell & Russell, LLP

(57) ABSTRACT

A data transfer method having a data retransmission function, in which a sending side saves data that was sent in memory, a receiving side uses a transmission confirmation signal to request the sending side to retransmit the data when the data was not properly received, then monitors the elapsed time, and when the data is not retransmitted after the elapsed time has exceeded a set time, uses a transmission confirmation signal again to request that the data be retransmitted, and where in response to that transmission confirmation signal, the sending side retransmits the saved data to the receiving side.

9 Claims, 22 Drawing Sheets

(56) References Cited

U.S. PATENT DOCUMENTS

| | | | |
|---|---|---|---|
| 6,735,256 | B1 | 5/2004 | Toshimitsu |
| 7,315,898 | B2* | 1/2008 | Kohno ................... 709/230 |
| 7,376,426 | B2 | 5/2008 | Nakamata et al. |
| 2003/0014709 | A1* | 1/2003 | Miyoshi et al. ........... 714/758 |
| 2003/0120802 | A1 | 6/2003 | Kohno |
| 2004/0170179 | A1* | 9/2004 | Johansson et al. ....... 370/395.2 |
| 2005/0007948 | A1* | 1/2005 | Wan et al. ............... 370/208 |
| 2005/0094667 | A1 | 5/2005 | Dahlman et al. |
| 2005/0213505 | A1 | 9/2005 | Iochi et al. |
| 2006/0045010 | A1 | 3/2006 | Baker et al. |
| 2006/0067222 | A1 | 3/2006 | Endoh |
| 2006/0176853 | A1 | 8/2006 | Liu et al. |
| 2007/0258407 | A1 | 11/2007 | Li et al. |

OTHER PUBLICATIONS

Joe Ebihara et al., "Mobile IP Handoff ni Okeru TCP Tsushin no Kosokuka ni Kansuru Kento", IEICE Technical Trport 2003-MBL-25, The Institute of Electronics, Information and Communication Engineers, vol. 2003, No. 67, pp. 9 to 16 sections 2 to 4 dated Jul. 4, 2003.
3GPP TR R3.018 Vo.4.1 (May 2006) 3rd Generation Partnership Project; Technical Specification Group Radio Access Network, Evolved UTRA and UTRAN; Radio Access Architecture and Interfaces (Release 7).
3GPP TR 25.813 V7.0.0 (Jun. 2006) 3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7).
3GPP TR 25.912.V7.0.0 (Jun. 2006) 3rd Generation Partnership Project; Technical Specification Group Radio Access Network; Feasibility study for Evolved Universal Terrestrial Radio Access (UTRA) and Universal Terrestrial Radio Access Network (UTRAN) (Release 7).
3GPP TR 25.912 V0.1.7 (Jun. 2006) 3rd Generation Partnership Project; Technical Specification Group Radio Access Network; Feasibility study for Evolved UTRA and UTRAN (Release 7).
International Search Report dated Oct. 31, 2006.
Extended European Search Report dated May 8, 2012 received in Application No. 06811175.6-1237/2068503.
Non-Final Office Action dated Jan. 6, 2012 received in U.S. Appl. No. 12/416,828.
Final Office Action dated Jun. 20, 2012 received in U.S. Appl. No. 12/416,828.
Non-final Office Action dated May 8, 2013 received in U.S. Appl. No. 12/416,828.
Extended European Search Report dated Mar. 4, 2013 issued by the European Patent Office Application No. 12197231.9-1851.
Non-final Office Action dated Oct. 11, 2013 received in U.S. Appl. No. 12/416,828.
Final Office Action dated Apr. 16, 2014 received in U.S. Appl. No. 12/416,828.
Notice of Allowance dated Jul. 8, 2014 received in U.S. Appl. No. 12/416,828.

* cited by examiner

FIG. 25 PRIOR ART
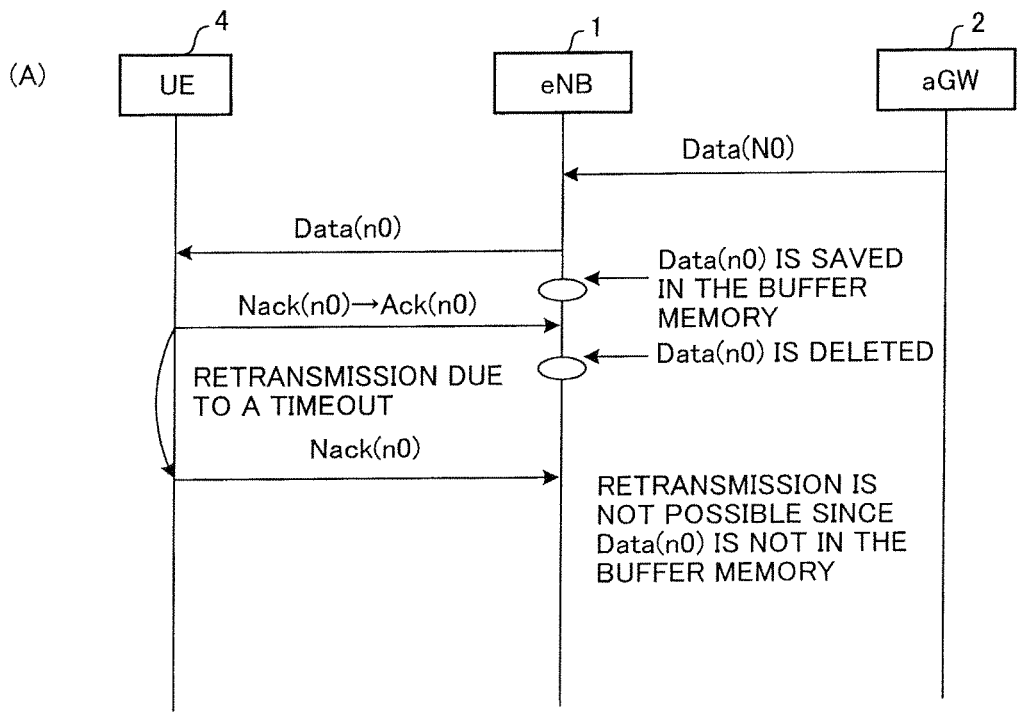
(A)
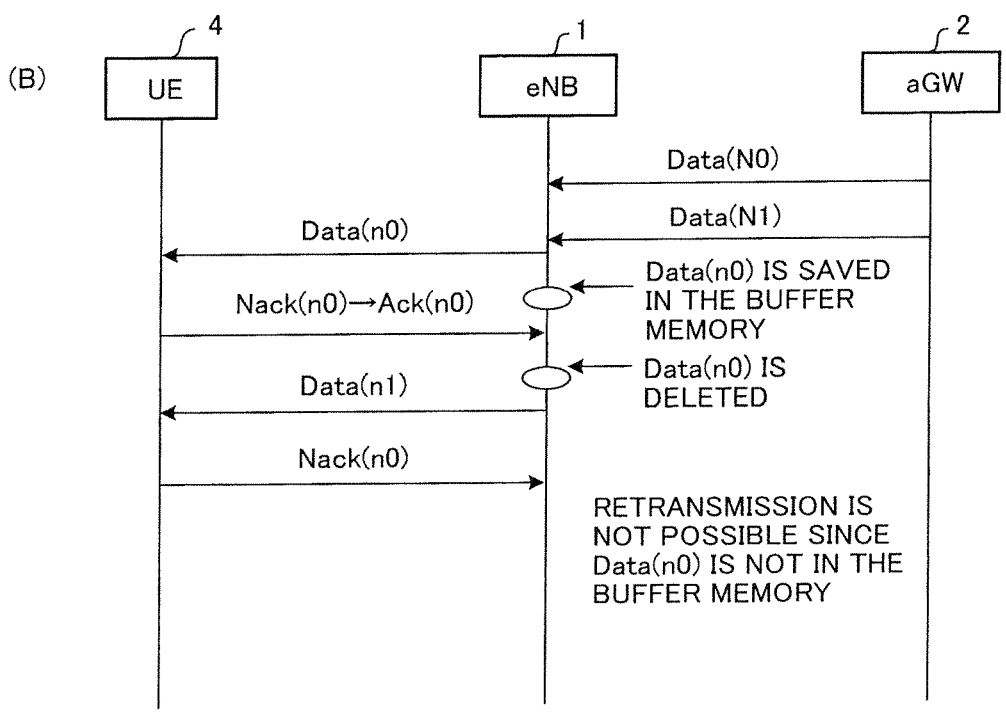
(B)

DATA TRANSFER METHOD

CROSS-REFERENCE TO RELATED APPLICATIONS

This application is a continuation application of international PCT application No. PCT/JP2006/319835 filed on Oct. 4, 2006.

BACKGROUND OF THE INVENTION

The present invention relates to a data transfer method, and more particularly to a data transfer method of a data communication system in which: a receiving side that received data transmits a transmission confirmation signal that indicates whether or not the data was received properly; a sending side makes reference to the confirmation signal and retransmits that data when the receiving side did not receive the data properly.

From the aspect of ease of use and cost, system have been constructed that use IP (Internet Protocol) and other related protocols as today's communication systems. Protocol groups that are on the basis of this IP protocol can be applied not only to fixed-line communication systems, but to mobile communication systems as well. Moreover of this protocol group, the SIP (Session Initiation Protocol) is becoming the standard protocol used for call control. In next-generation network systems, attempts are being made to build an integration system that is based on an IMS (IP Multimedia Subsystem) that uses this SIP protocol, such that all fixed-line communication networks and mobile communication networks are connected this integration system.

LTE/SAE System

FIG. 15 illustrates an example of the construction of an LTE/SAE (Long Term Evolution/System Architecture Evolution) system, which is a next generation network system (Evolved 3GPP system) that connects to an IMS (refer to 3GPP TR R3.018 vo. 4.1 (2006-05)). The LTE/SAE system comprises eNB (evolved-UTRAN NodeB) 1a to 1n, which are base stations, access gateways aGW (evolved-UTRAN Access Gateway) 2a to 2b, which bundle and control some of the base stations, and an IASA (Inter Access System Anchor) 3, which is an anchor for the overall network.

The base stations eNB 1a to 1n comprise a functions that are nearly the same as the function of a conventional bas station NB and radio network controller RNC. During call connection, a user terminal and eNB are connected by RRC (Radio Resource Control), after which the user terminal and aGW are connected by Attach, and the aGW is notified of the unique number (terminal ID) of the user terminal. The aGW 2a to 2b control transmission/reception of messages between the user terminals 4a, 4b and the IASA 3, and together with the eNB 1a to in, form an LTE-RAN (Radio Access Network).

The IASA 3 having a router like function, connects to the IMS 5, as well as connects to a HSS (Home Subscriber Server) 6 that saves subscriber profiles. After RCC connection is completed, the HSS 6 performs verification of the user terminals via the IASA 3 and aGW 2a, 2b, and the aGW 2a, 2b register with the HSS 6 that they are in charge of the current call.

After verification and registration are completed, the IASA 3 receives SIP messages for call control from the user terminals via the eNB 1a to in and aGW 2a to 2b, then sends the messages to the IMS 5, and sends SIP messages for call control that are received from the IMS to the user terminals 4a, 4b via the aGW 2a to 2b and eNB 1a to 1n. Moreover, after the connection control is completed, the IASA 3 sends data, that is received from to user terminals via, the eNB 1a to 1n and aGW 2a to 2b to the IMS 5 and sends data that is received from the IMS 5 to the user terminals 4a, 4b via the aGW 2a, 2b and eNB 1a to 1n. The IASA 3 and aGW 2a, 2b form a core network CN.

In the LTE/SAE system described above, an aGW that performs calling outgoing and called processing (RRC connection setting) that connects a user terminal to a service network has been basically decided for each eNB. In the figure, the RCC connection setting for the user terminal that communicates with eNB 1a to 1b is basically performed by aGW 2a, and the RCC connection setting for the user terminal that communicates with eNB 1c to 1n is basically performed by aGW 2b.

However, as illustrated in FIG. 16, in the case of a Handover that occurs when the user terminal 4a moves, Handover processing is performed so that connection continues even though eNB 1c is outside the jurisdictional control of aGW 2a. The interface between the aGW and eNB that makes this processing possible is called S1-flex.

Handover

FIG. 17 is a drawing explaining handover in a LTE/SAE system, and FIG. 18 is a drawing explaining the currently assumed handover procedure in a LTE/SAE system. Here, the base station that the user terminal 4a is communicating with before changing a serving base stations due to a handover is called the source base station (SeNB), and the base station that the user terminal 4a will communicate with after changing is called the target base station (TeNB).

The user terminal 4a uses a Measurement Report to notify the source base station 1a that a handover H0 is necessary (step (1)).

Based on the contents of the Measurement Report, the source base station 1a designates a target base station 1b (step (2)), sends UE Context to that target base station 1b and requests that it prepare for a handover H0 (step (3)). The UE Context contains information that is necessary for the target base station 1b to communicate with the user terminal 4a.

The target base station 1b stores the received UE Context in an internal buffer memory, then obtains and maintains the resources that are necessary for communication with the user terminal 4a (step (4)). After preparation for a handover H0 is complete as described above, the target base station 1b reports to the source base station 1a that preparation is complete (UE Context Confirmation: step (5)).

After receiving the UE Context Confirmation, the source base station 1a begins sending UP data (User Plane Data) that is received from the aGW 2a and saved to the target base station 1b (UP Data Forwarding), and using a H0 Command, notifies the user terminal 4a that handover has begun (step (6)).

After receiving the H0 Command, the user terminal 4a exchanges synchronization data with the target base station 1b and establishes synchronization (step (7)). After synchronization has been established, the user terminal 4a notifies the target base station 1b that handover is complete (H0 Response; step (8)).

After receiving the H0 Response, the target base station 1b sends a request to the aGW 2a to switch the path that goes to the source base station 1a to the target base station 1b (Path Change Request: step (9)). In response to this, the aGW 2a switches the path and sends a path change response (Path Change Confirmation) to the target base station 1b (step (10)). After receiving the Path Change Confirmation, the target base station 1b notifies the source base station 1a that handover H0 is complete (H0 Complete: step (11)). The path between the source base station 1a and the aGW 2a is then eliminated.

Path Change During Handover

FIG. 19 and FIG. 20 are drawings explaining the change of the path for Downlink/Uplink Data during a handover. Downlink Data is data from the network side to a user terminal, and Uplink Data is data from a user terminal to the network side.

Downlink Data is first sent along the path aGW 2a→source base station 1a→user terminal 4a (see (a) of FIG. 19). In this state, in step (6) illustrated in FIG. 18, when the source base station 1a notifies the user terminal 4a that a handover has begun using a H0 command, the source base station 1a forwards all of the data coming from the aGW 2a to the target base station 1b (see (b) of FIG. 19).

After that, in step (8), after the user terminal 4a notifies the target base station 1b that handover is complete, the target base station 1b sends the data that was forwarded from the source base station 1a to the user terminal 4a (see (c) of FIG. 19). In addition, in step (9), when the aGW 2a receives a request to switch the path, it switches the destination for sending data from the source base station 1a to the target base station 1b and sends data to the target base station 1b, after which the target base station 1b sends the received data to the user terminal 4a. When sending data to the user terminal 4a, the target base station 1b must begin sending data received from the aGW 2a after sending all of the data that was forwarded from the source base station 1a (Reordering is necessary).

Uplink data is first sent along the path user terminal 4a→source base station 1a→aGW 2a (see (a) of FIG. 20). In this state, in step (6) illustrated in FIG. 18, when the source base station 1a notifies the user terminal 4a that handover has begun using a H0 Command, the user terminal 4a stops data transmission, and starts control to establish synchronization with the target base station 1b. The source base station 1a sends all of the data received from the user terminal 4a up to that time to the aGW 2a (see (b) of FIG. 20).

After that, in step (8), the user terminal 4a notifies the target base station 1b that handover is completed and restarts sending Uplink data.

The transmission of Uplink data differs from the transmission of Downlink data in that there is no forwarding and it is not necessary to consider Reordering.

Protocol Stack and Processing of U-Plane Data of Each Device

FIG. 21 is a drawing explaining the protocol stack of the U-plane data of the user terminal (UE) 4, base station (eNB 1) and aGW 2, where the protocol stack comprises four layers; a physical layer (PHY), MAC (Medium Access Control) layer, RLC (Radio Link Control) layer and PDCP (Packet Data Convergence Protocol) layer. Data transmission is performed between the user terminal (UE) 4 and aGW 2 in the PDCP layer, and data transmission is performed between the user terminal 4 and base station 1 in the RLC layer. The main function of each protocol is as described below.

(1) PDCP: In the PDCP layer, the sending side compresses the high-level protocol header, attaches a sequence number and transmits data. The receiving side checks the sequence number and a discard process of redundant reception. Retransmission is not performed in the PDCP layer.

(2) RLC: The RLC layer is a layer having a retransmission function, where based on the sequence number that is attached to the data from the PDCP layer, the sending side attaches a new sequence number in the RLC layer, and transmits the data.

For example, when data having sequence number N is received from the PDCP layer, that data is divided into a plurality of divisions and in the RLC layer the sending side attaches sequence numbers N(1), N(2), N(3), . . . , to each data division and transmits the data. The receiving side uses those sequence numbers and notifies the sending side with a transmission confirmation signal (Ack/Nack signal) whether or not the data was received properly. When an Ack signal is returned, the sending side discards saved data; however, when a Nack signal is returned, retransmits the data.

(3) MAC: The MAC layer is a layer that multiplexes/separates data of the RCL layer. In other words, the sending side multiplexes the data of the RLC layer as transmission data, and the receiving side separates the received MAC layer data into RLC layer data.

(4) PHY: The PHY layer is a layer for performing radio transmission of data between a user terminal 4 and base station 1, where MAC layer data is converted to radio transmission data, or radio transmission data is converted to MAC layer data.

FIG. 22 is a drawing illustrating the construction of each device, where the user terminal (UE) 4 comprises PDCP processing units 4-1a to 4-1n and RLC processing units 4-2a to 4-2n that are provided for each QoS unit (information transfer performance, information transfer speed, etc., for audio, video and the like), and a MAC/PHY layer processing unit 4-3 that multiplexes the RLC data created by each of the RLC processing units, and converts the data to radio transmission data. The base station (enB) 1 comprises a MAC/PHY layer processing unit 1-1 and RLC processing units 1-2a to 1-2n that are provided for each QoS unit. The MAC/PHY layer processing unit 1-1 converts radio transmission data to MAC data, separates that MAC data to RLC data, and inputs the RLC data to the PDCP processing units 1-2a to 1-2n, then the RLC processing units 1-2a to 1-2n put together several RLC data to create a packet and send the packet to the aGW2. Retransmission processing is performed for each data between the base station (eNB) 1 and the user terminal (UE) 4 on the RLC layer level.

Retransmission Procedure by Sequence Number

FIG. 23 is a drawing explaining the retransmission procedure by sequence number.

Normally, as illustrated in (A) of FIG. 23, the base station (eNB) 1 converts the Data(N0) that was received from the aGW 2 to RLC layer Data(n0), and together with saving that RLC layer Data(n0) in a buffer memory, sends that Data(n0) to the user terminal (UE) 4. When the user terminal (UE) 4 is able to properly receive the Data(n0) (normal reception), the user terminal 4 notifies the base station (eNB) 1 that the data was properly received by sending an Ack(n0) signal. After receiving the Ack(n0) signal, the base station 1 deletes the Data(n0) that is saved in the buffer memory.

N0 is the sequence number that was attached in the PDCP layer, n0 is the sequence number in the RLC layer and is created based on the sequence number N0. Moreover, in the figure, in order to simplify the explanation, only one item of RLC layer Data(n0) is illustrated to correspond with one item of PDCP layer Data(N0), however, actually one item of PDCP layer Data(N0) is separated into a plurality of RLC layer data, and sequence numbers are attached to each item of data in the RLC layer, such as Data(n1), Data(n2), Data(n3), and the like.

When Data(n0) is not properly received (abnormal reception), the retransmission procedure described below is performed (see (B) of FIG. 23). After RLC layer Data(n0) is sent from the base station 1, when that Data(n0) could not be properly received, the user terminal 4 notifies the base station 1 of the abnormal reception by sending a Nack(n0) signal. When the base station 1 receives a Nack(n0) signal, it retransmits Data(n0). After this retransmission, when Data(n0) is properly received, the user terminal 4 notifies the base station 1 that data was properly received by sending an Ack(n0) signal. After receiving the Ack(n0) signal, the base station 1 deletes Data(n0) that is saved in the buffer memory.

In the example above, processing was performed for each single item of RLC layer data, however, it is possible to send a plurality of items of RLC layer data before checking whether or not the data was properly received. The number of items of RLC data which can be sent before checking the reception is called the window size. In FIG. 23, (A) and (B) are examples of a window size of 1.

In FIG. 23, (C) is an example of proper reception when the window size is 3. After properly receiving three items of data, Data(n0), Data(n1) and Data(n2), the receiving terminal 4 notifies the base station 1 with a single Ack signal (in this case Ack(n2)) for the three items of data received properly. After receiving the Ack(n2) signal, the base station 1 determines that data up to the sequence number n2 were properly received and deletes the three saved items of data; Data(n0), Data(n1) and Data(n2).

On the other hand, when, for example, Data(n1) could not be received properly, the receiving terminal 4 sends a Nack (n1) signal (see (D) of FIG. 23) to notify the base station 1 that reception was not proper. After receiving the Nack(n1) signal, the base station 1 deletes the saved data Data(n0) before sequence number n1, and retransmits the data from sequence number n1 and later; Data(n1) and Data(n2). When the retransmitted data, Data(n1) and Data(n2), are properly received, the user terminal 4 sends an Ack(n2) signal to notify the base station 1 that reception was normal. After receiving the Ack(n2) signal, the base station 1 deletes Data(n1) and Data(n2) that are saved in the buffer memory.

The procedure described above is for Downlink transmission, however a similar procedure is also performed for Uplink transmission.

Processing when an Error is Detected in the Transmission Confirmation Signal

In a radio transmission zone, not only transmission data, but the Ack/Nack signals, which are transmission confirmation signals, may also become corrupted and mistakenly received. FIG. 24 is a drawing explaining the processing procedure when an error is detected in a transmission confirmation signal.

As illustrated in (A) of FIG. 24, when the confirmation signal Ack(n0) is mistakenly detected as a Nack(n0) signal, the base station 1 retransmits Data(n0). The user terminal 4 detects that there has been redundant reception of Data(n0), and together with eliminating one, resends the Ack(n0) signal. After receiving the Ack(n0) signal, the base station 1 deletes Data(n0) that is saved in the buffer memory. From the above processing, when an Ack signal is mistakenly detected as being a Nack signal, the user terminal only receives the same data again redundantly, and by eliminating that data no problems occur.

As illustrated in (B) of FIG. 24, in the case where the window size is 3, when the confirmation signal Ack(n2) is mistakenly detected as Nack(n2), the base station 1 performs retransmission of Data(n2), and deletes Data(n0) and Data (n1) that are saved. The user terminal 4 detects redundant reception of Data(n2), and eliminates one, as wells as resends the Ack(n2) signal. After receiving the Ack(n2) signal, the base station 1 deletes Data(n2) that is saved in the buffer memory. From the above processing, when an Ack signal is mistakenly detected as a Nack signal, even when the window size is a plurality of data, the user terminal only receives the same data again redundantly, and no problem occurs. The Nack(n2) signal indicates that the data before sequence number n2 have been properly received, or in other words, includes the meaning of the signal Ack(n1).

When the window size is a plurality of data and the Ack signal is mistakenly detected as the Nack signal, there is a possibility that there will be an error in the sequence number. In a case where the window size 1, it is possible to eliminate the bad effect due to the possibility by not using the sequence number in the Ack/Nack signal. In a case where the window size is a plurality of data and a Nack signal is returned as illustrated in (C) of FIG. 24, the base station 1 retransmits all of the data, Data(n0) to Data(n2), of the windows size that are saved in the buffer memory regardless of the sequence number of that Nack signal. Moreover, after receiving the Ack(n2) signal, the base station 1 deletes Data(n0) to Data(n2) that are saved.

Problem when Detecting an Error in the Transmission Confirmation Signal

As was explained above, when an Ack signal is mistakenly detected as a Nack signal no problem occurs. However, a problem occurs when a Nack signal is mistakenly detected as an Ask signal. FIG. 25 is a drawing explaining the control procedure when a Nack signal is mistakenly detected as an Ask signal.

As illustrated in (A) of FIG. 25, when the Nack(n0) signal is mistakenly detected as the Ask(n0) signal, the base station 1 deletes Data(n0) that is saved in the buffer memory, and does not perform retransmission. The user terminal monitors the time that has elapsed since the Nack(n0) was sent, and when Data(n0) has not been received after a set amount of time has passed, sends the Nack(n0) signal to the base station 1 again (retransmission request due to timeout). Even though the base station correctly receives the Nack(n0) signal, Data (n0) has already been deleted from the buffer memory, so is not able to perform retransmission, and a problem occurs in that the data has been lost.

In the procedure above, by sending a retransmission request due to a timeout from the user terminal 4 the base station 1 knows of the necessity for retransmission. The base station 1 also able to know of the necessity for retransmission of data based upon the Nack response sent from the user terminal for the next transmission data. In other words, as illustrated in (B) of FIG. 25, when the Nack(n0) signal is mistakenly detected to be the Ack(n0) signal, the base station 1 deletes Data(n0) that is saved in the buffer memory, and does not perform retransmission. The base station then sends the next data, Data(n1), to the user terminal. However, the user terminal 4 is waiting to receive Data(n0), and when it receives Data(n1), sends the Nack(n0) signal to the base station 1 again. Even though the base station 1 receives the Nack(n0) signal, Data(n0) has already been deleted from the buffer memory, so is not able to perform retransmission, and a problem occurs in that the data has been lost.

Retransmission Operation During a Handover

FIG. 26 is a drawing explaining the retransmission control procedure for retransmitting Downlink data during a handover. FIG. 26 does not clearly illustrate the saving and deletion of data in a buffer memory, however, after data has been transmitted, it is saved in a buffer memory, and when there is notification that the data has been properly received, the data is deleted from the buffer memory. The same is true in the following figures as well.

First, data is sent along the path aGW 2a→source base station 1a→user terminal 4a. The source base station 1a creates Data(n0) from Data(N0) that is received from the aGW 2a, and sends that Data(n0) to the user terminal 4a, and after properly receiving Data(n0), the user terminal 4a sends an Ack(n0) signal to the source base station 1a. Next, the source base station 1a creates Data(n1) from Data(N1) that is received from the aGW 2a, and sends that Data(n1) to the user terminal 4a. At that time, when handover start conditions are satisfied based on the handover control that is being performed at the same time, the source base station 1a uses an H0 Command to notify the user terminal 4a of the start of the handover even without receiving an Ack/Nack signal. By receiving the H0 Command, the user terminal 4a immediately starts control for establishing synchronization with the target base station 1b without sending an Ack/Nack signal for Data (n0) to the source base station 1a. On the other hand, the source base station 1a forwards all of the data received from the aGW 2a to the target base station 1b. In this forwarding of data, the source base station 1a first forwards Data(n1), for which confirmation of proper reception was not obtained from the user terminal 4a, then forwards Data(n2), . . . on.

After that, when the user terminal 4a notifies the target base station 1b with a H0 Response that handover is complete, the target base station 1b sends a request (Path Change Request: PC-Req) to the aGW 2a to change the path that goes to the source base station 1a to the target base station 1b. In so doing, the aGW 2a changes the path and returns a path change response (PC-Res) to the target base station 1b, after which the aGW 2a sends data starting from Data(N3) to the target base station 1b.

Moreover, after receiving the H0 Response, the target base station 1b sends the data that was forwarded from the source base station 1a in order starting from Data(n1), and after properly receiving the data, the user terminal 4a returns an Ack(n1) signal. When the target base station 1b sends data to the user terminal 4a, after all of the data (Data(n1), Data(n2)) that were forwarded from the source base station 1a have been sent, the target base station 1b must start sending Data(n3) that was directly received from the aGW 2a (Reordering is necessary).

As was explained above, when the source base station 1a does not receive an Ack/Nack signal for data (Data(n1) in the figure) that was sent to the user terminal 4a due to the start of a handover, the source base station 1a forwards that data to the target base station 1b, and that target base station 1b sends that data to the user terminal again, so the data is not lost. The user terminal 4a then deletes one of the redundantly received data.

FIG. 27 is a drawing explaining the retransmission control procedure for the retransmission of Uplink data during a handover.

First, data is sent along the path user terminal 4a→source base station 1a→aGW 2a. After receiving Data(n0) from the user terminal, the source base station 1a converts that Data (n0) to Data(N0) and sends Data(N0) to the aGW 2a, as well as sends an Ack(n0) signal to the user terminal 4a when Data(n0) is received properly. Next, after receiving Data(n1) from the user terminal 4a, the source terminal 1a converts that Data(n1) to Data(N1) and sends Data(N1) to the aGW 2a, At that point in time, when conditions for starting handover are satisfied based on handover control that is being performed at the same time, the source base station 1a uses a H0 Command to notify the user terminal 4a that handover has begun before sending an Ack/Nack signal for Data(n1). In doing so, the user terminal 4a stops data transmission, and immediately begins control for establishing synchronization with the target base station 1b. After the establishment of synchronization is completed, the user terminal 4a uses a H0 Response to notify the target base station 1b that handover is completed. After doing this, it is not illustrated in the figure, however, the target base station 1b performs path change control with the aGW 2a, after which the target base station 1b can directly send data received from the user terminal 4a to the aGW 2a.

After that, the user terminal 4a sends data to the target base station 1b in order starting from Data(n1) for which an Ack/Nack signal indicating the reception result was not received, then the target base station 1b converts that Data(n1) to Data (N1) and sends it to the aGW 2a. At this time, the aGW 2a redundantly receives Data(N1), however discards one. Moreover, each time data is received from the user terminal 4a, the target base station 1b sends an Ack/Nack signal indicating the reception result to the user terminal 4a.

As was described above, when the user terminal does not receive an Ack/Nack signal from the source base terminal for data that is sent (Data(n1) in the figure) due to the handover, it restarts sending that data after handover is complete, so data is not lost.

Problems During Handover

In the case described above, even though a handover occurs during the transmission of data, data is not lost, so there is no problem. However, when an Ack signal is mistakenly detected to be a Nack signal, data is lost in the retransmission of data.

FIG. 28 is a drawing explaining the retransmission control procedure for Downlink data during a handover, and is an example of the sequence illustrated in FIG. 26 where the user terminal 4a is not able to properly receive Data(n0) and sends a Nack(n0) signal to the source base station 1a, and the source base station 1a mistakenly received that signal as an Ack(n0) signal, after which handover control started.

After mistakenly receiving an Ack(n0) signal instead of an Nack(n0) signal, the source base station 1a deletes Data(n0) that is saved in the buffer memory. Therefore, when forwarding data based on the handover, the source base station 1a does not forward Data(n0) to the target base station 1b but forwards the data received from the aGW 2a starting from Data(n1) after Data(n0). After that, when handover is complete, the source base station 1a sends the forwarded data to the user terminal 4a as in the case illustrated in FIG. 26. When doing that, the source base station 1a does not send Data(n0) that was not properly received, but sends data starting from Data(n1). As a result, the user terminal 4a detects that a skip occurred in the sequence numbers of the received data, and sends a Nack(n0) signal for Data(n0) that was not received to the target base station 1b. However, target base station 1b does not have Data(n0), so the data is lost.

FIG. 29 is a drawing explaining the retransmission control procedure for Uplink data during a handover, and is of the case in the sequence illustrated in FIG. 27 where the source base station 1a is not able to properly receive Data(n1) and sends a Nack(n1) signal to the user terminal 4a, and that user terminal 4a mistakenly receives an Ack(n1) signal, after which handover control begins.

After mistakenly receiving an Ack(n1) signal instead of a Nack(n1) signal, the user terminal 4a deletes Data(n1) that is saved in the buffer memory. After that, when handover is complete and it becomes possible to send data, the user terminal 4a starts sending data starting from Data(n2). However, the target base station 1b that receives Data(n2) does not know that Data(n1) was not received, so without generating an Nack(n1) signal, converts Data(n2) to Data(N2) and sends that data to the aGW 2a. The aGW 2a has not received Data(N1), so after receiving Data(N2), detects that there was a jump of one in the sequence numbers, however the data is lost and the aGW 2a can do nothing.

A data retransmission control method has been disclosed for avoiding the problem of not retransmitting data when a Nack signal is mistakenly received as an Ack signal as described above (see Japanese patent application No. 2004-64691A).

However, this related art calculates the reliability using the reception quality, and based on that reliability determines whether the Ack signal is a real Ack signal according to the reception success, or whether a Nack signal that indicates reception failure has been mistakenly detected as an Ack signal. In this method, it is not possible to determine for certain that a Nack signal was mistakenly received as an Ack signal, so data is lost. Moreover, this related art does not cope with the case in which a Nack signal is mistakenly detected as an Ack signal and an error is concurrently detected in the sequence numbers. Furthermore, this related art does not cope with the case when a Nack signal is mistaken received as an Ack signal during a handover.

SUMMARY OF THE INVENTION

Taking the above into consideration, the object of the present invention is to prevent the loss of data in communication having a retransmission by a simple scheme even when a Nack signal is mistakenly detected as an Ack signal.

Another object of the present invention is to prevent the loss of data even when a Nack signal is mistakenly detected as an Ack signal, and the sequence number is also mistakenly detected.

Another object of the present invention is to prevent the loss of data in communication having a retransmission function even when a handover is started after a Nack signal is mistakenly detected as an Ack signal.

Another object of the present invention is to prevent the loss of data even when a handover is started after a Nack signal is mistakenly detected as an Ack signal and the sequence number is mistakenly detected.

The present invention is a data transfer method of a data communication system in which a receiving side, after receiving data, sends a transmission confirmation signal to a sending side indicating whether or not the data was received properly, and the sending side makes reference to the transmission confirmation signal to identify that the receiving side did not proper receive the data and retransmits that data.

A first form of the data transfer method of the present invention comprises steps of: sending data to which a sequence number is attached from a sending side to a receiving side and saving the data in a memory of the sending side; A) in a case where the data was not received proper; sending, from the receiving side to the sending side a transmission confirmation signal which requests the sending side to retransmit the data and to which a sequence number of the data is attached; monitoring a period of time which elapses from the time when the transmission confirmation signal is sent to the sending side; when the data is not retransmitted even if the elapsed time exceeds a set time or when data which is different from the data to be retransmitted is received, sending a transmission confirmation signal again to the sending side; and retransmitting the data that is saved in the memory from the sending side to the receiving side in response to the transmission confirmation signal; and B) in a case where the data was received properly; sending, from the receiving side to the sending side a transmission confirmation signal which indicates proper reception; and deleting data having a sequence number less than (S-W) from the memory in the sending side in which the maximum number of items of data that can be transmitted even when the transmission confirmation signal is not received is W, and the sequence number that is attached to the transmission confirmation signal that indicates proper reception is S.

A second form of the data transfer method of the present invention comprises steps of: sending data to which a sequence number is attached from a source base station to a mobile terminal saving data that is sent from the source base station to the mobile terminal that is in communication with the source base station in a memory of the source base station before a handover control for changing a serving base station from the source base station to a target station in order to continue communication; sending a transmission confirmation signal to which a sequence number is attached from the mobile terminal to the source base station to indicate whether or not data was received properly; in a case where the data was not received proper, retransmitting the data that is saved in the memory from the source base station to the mobile terminal side in response to the transmission confirmation signal; in a case where the data was received properly deleting data having a sequence number less than (S-W) from the memory in the sending side in which the maximum number of items of data that can be transmitted even when the transmission confirmation signal is not received is W, and the sequence number that is attached to the transmission confirmation signal that indicates proper reception is S; forwarding the data saved in the memory from the source base station to the target base station when the handover control starts; and sending the data that was received from the source base station, to the mobile terminal by the target base station when communication with the mobile terminal becomes possible.

A third form of the data transfer method of the present invention comprises steps of: saving data that is sent from a mobile terminal to a source base station that is in communication with the mobile terminal in a memory of the mobile terminal before the mobile terminal a handover control which changes a serving base stations from the source base station to a target base station in order to continue communication; sending a transmission confirmation signal from the source base station to the mobile terminal to indicate whether or not the data was received properly; forwarding the transmission confirmation signal from the source base station to the target base station when the handover control starts after the transmission confirmation signal is sent; sending the transmission confirmation signal that was forwarded from the source base station to the mobile terminal by the target base station when communication with the mobile terminal becomes possible; and in a case where the transmission confirmation signal requests retransmission, retransmitting the data from the mobile terminal.

The third form of the data transfer method of the present invention further comprises steps of: the mobile terminal attaching a sequence number to the data; the source base station attaching that sequence number to the transmission confirmation signal; and in a case where the transmission confirmation signal indicates that reception was proper, the mobile terminal deleting data having a sequence number that is less than the sequence number that is attached to the transmission confirmation signal from the memory.

BRIEF DESCRIPTION OF THE DRAWINGS

FIG. 25 is a drawing explaining the processing procedure when a Nack signal is mistakenly detected as an Ack signal.

DESCRIPTION OF THE PREFERRED EMBODIMENTS (A) System Configuration

Figure 1:
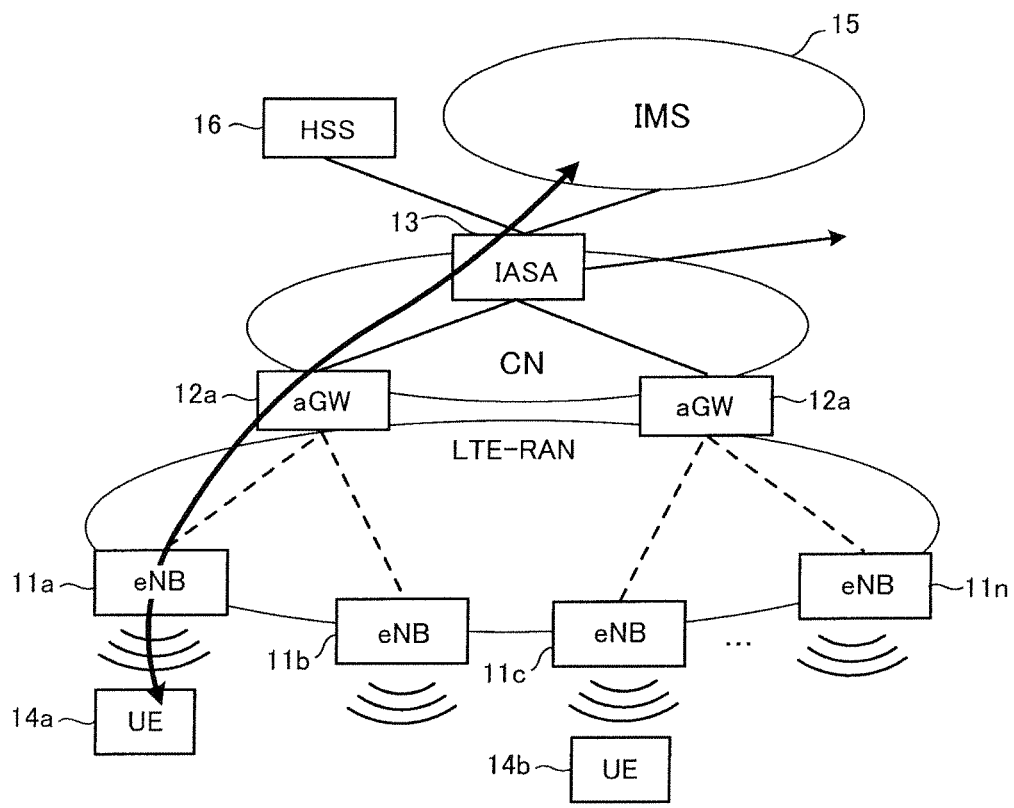
FIG. 1 is a drawing illustrated the configuration of a LTE/SAE system of the present invention.

FIG. 1 is a drawing illustrating the configuration of an LTE/SAE system of the present invention, where the system comprises base stations eNB 11a to 11n, access gateways aGW 12a to 12b that bundle and control some of the base stations, and an overall network anchor IASA (Inter Access System Anchor) 13. The base stations eNB 11a to 11n perform radio communication of data with and handover control of user terminals UE 14a, 14b. The aGW 12a to 12b receive and transfer messages between the user terminals 14a, 14b and IASA 13.

The IASA 13 has a router-like function, and together with connecting to an IMS 15, connects to an HSS 16 that saves subscriber profiles. During call connection, the IASA 13 receives SIP messages for call control from user terminals via the eNB 11a to 11n and aGW 12a to 12b, and sends them to the IMS 15, as well as sends SIP messages for call control received from the IMS 15 to the user terminals 14a, 14b via the aGW 12a to 12b and eNB 11a to 11n. Moreover, after call connection control is completed, the IASA 13 receives data from the user terminals via the eNB 11a to 11n and aGW 12a to 12b, and sends that data to the IMS 15, as well as sends data received from the IMS 15 to the user terminals 14a, 14b via the aGW 12a to 12b and eNB 11a to 11n.

Figure 2:
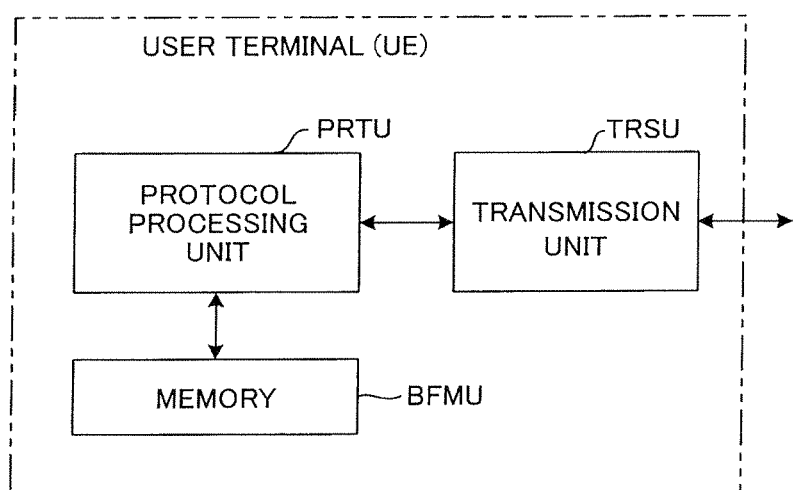
FIG. 2 is a drawing illustrated the construction of a user terminal (UE).
Figure 3:
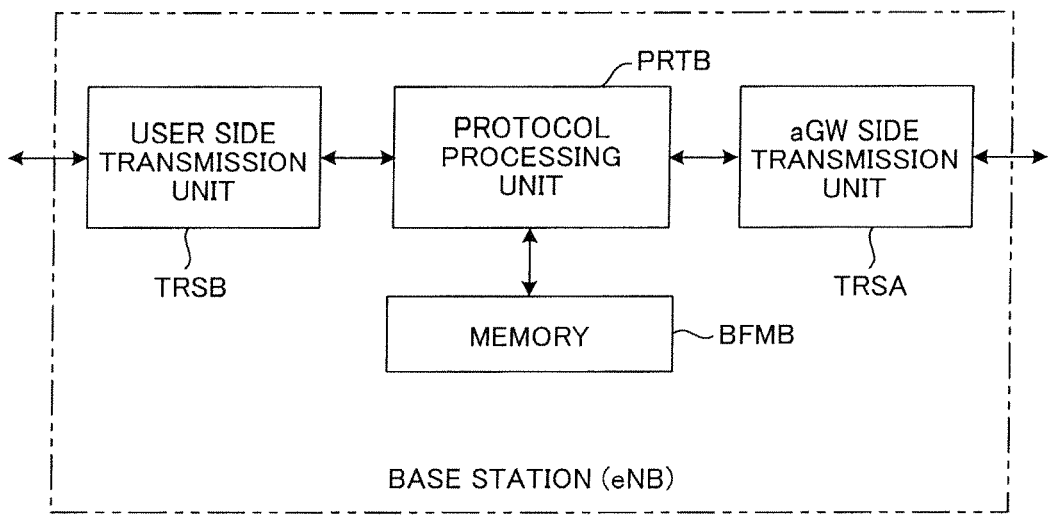
FIG. 3 is a drawing illustrated the construction of a base station (eNB).

As illustrated in FIG. 2, the user terminals 14a, 14b comprise a transmission unit TRSU that performs radio transmission of data with the base stations 11a to 11n, a protocol-processing unit PRTU that performs processing according to the protocol used, and a buffer memory BFMU that saves various data. As illustrated in FIG. 3, the base terminals 11a to 11n comprise a transmission unit TRSB that performs radio transmission of data with the user terminals, a transmission unit TRSA that performs data transmission with the aGW 12a to 12b, a protocol-processing unit PRTB that performs processing according to the protocol used, and a memory BFMB that saves various data.

Figure 21:
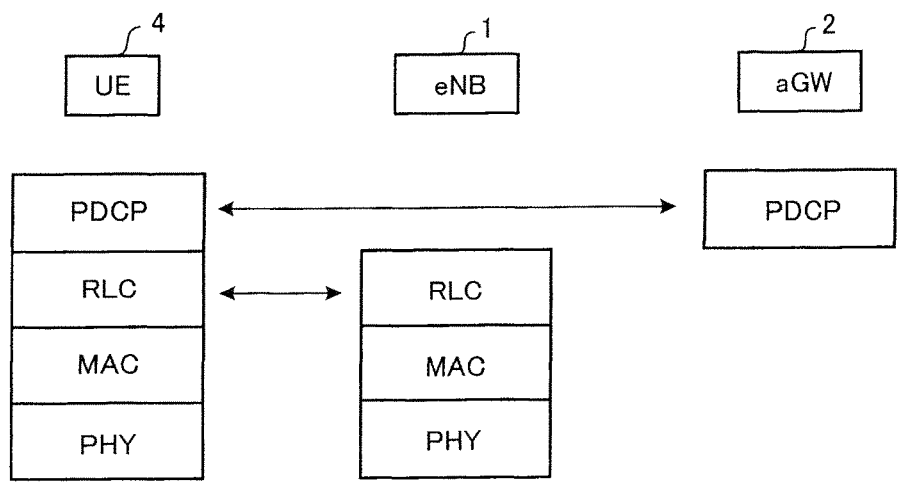
FIG. 21 is a drawing explaining the construction of a protocol stack for U-plane data.
Figure 22:
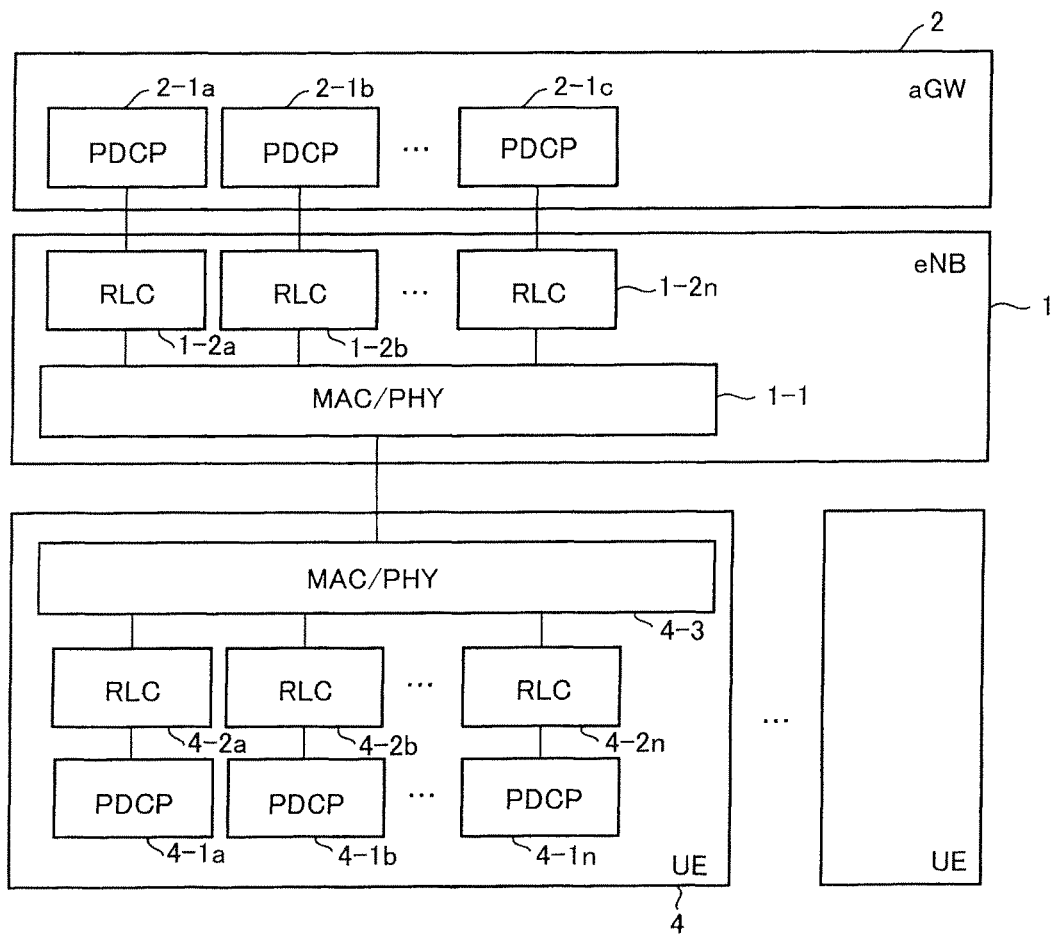
FIG. 22 is a drawing illustrating the construction of each unit.
Figure 23:
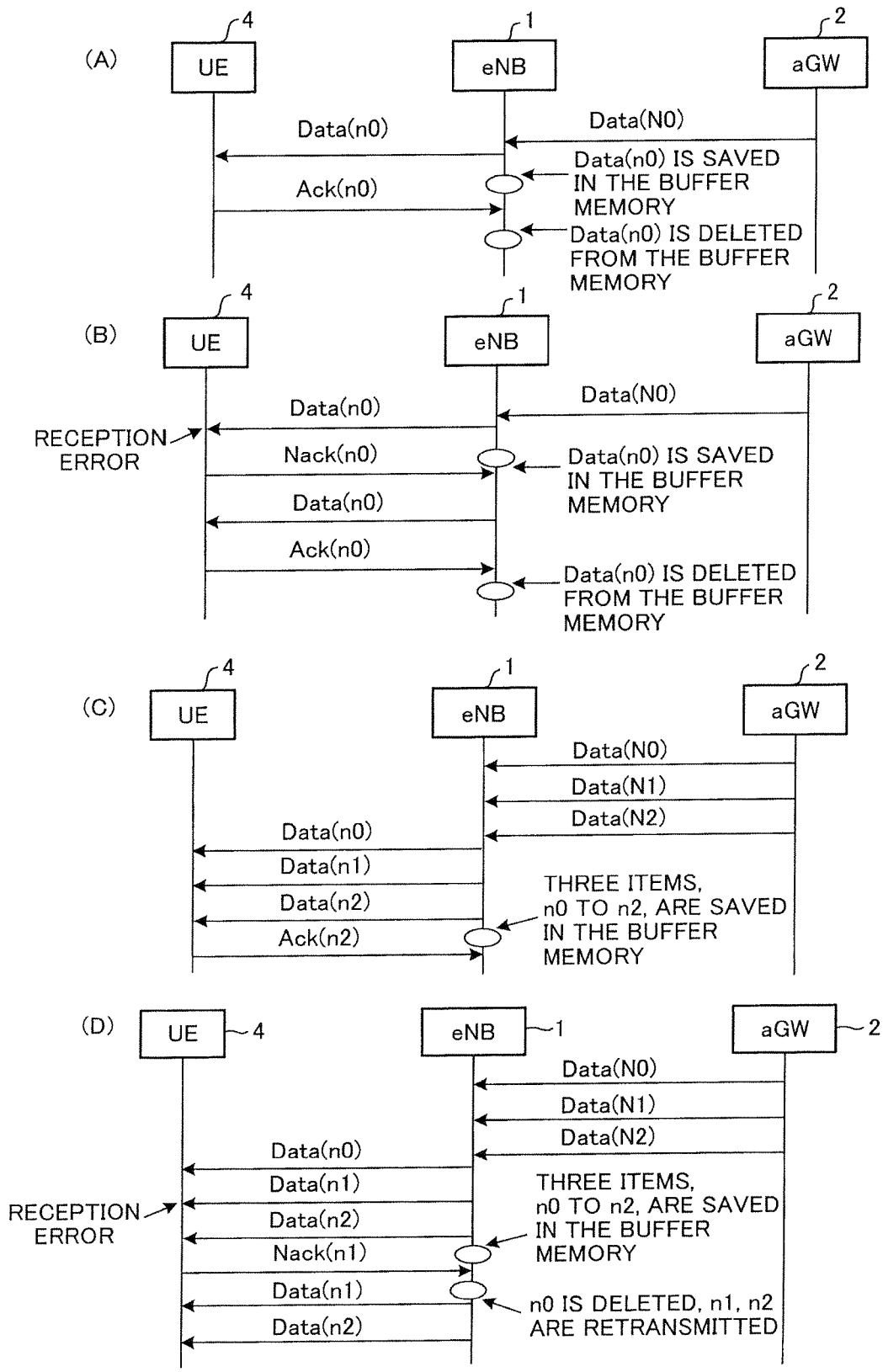
FIG. 23 is a drawing explaining a retransmission procedure according to sequence numbers.
Figure 24:
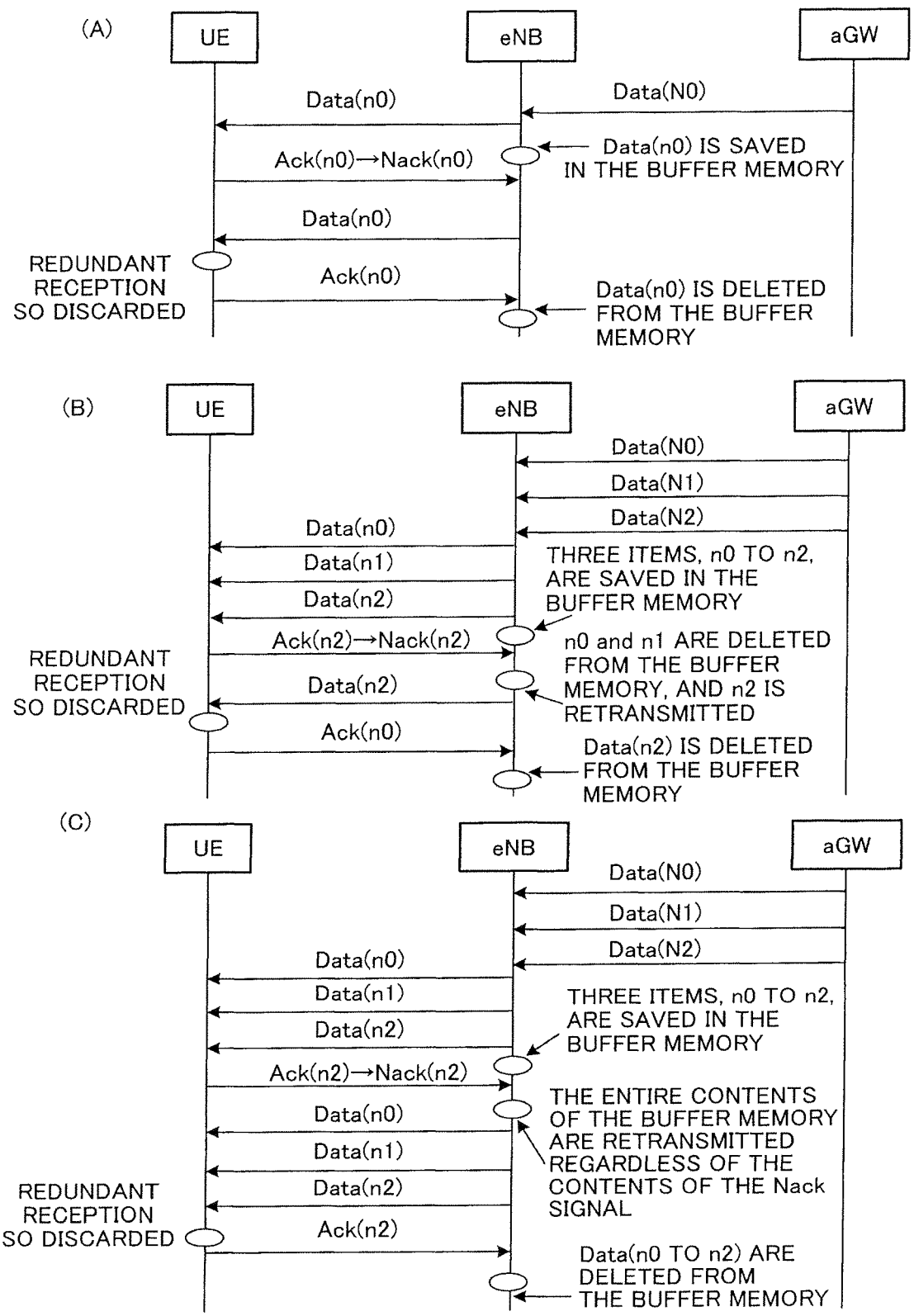
FIG. 24 is a drawing explaining the processing procedure when a transmission confirmation signal is mistakenly detected.
Figure 26:
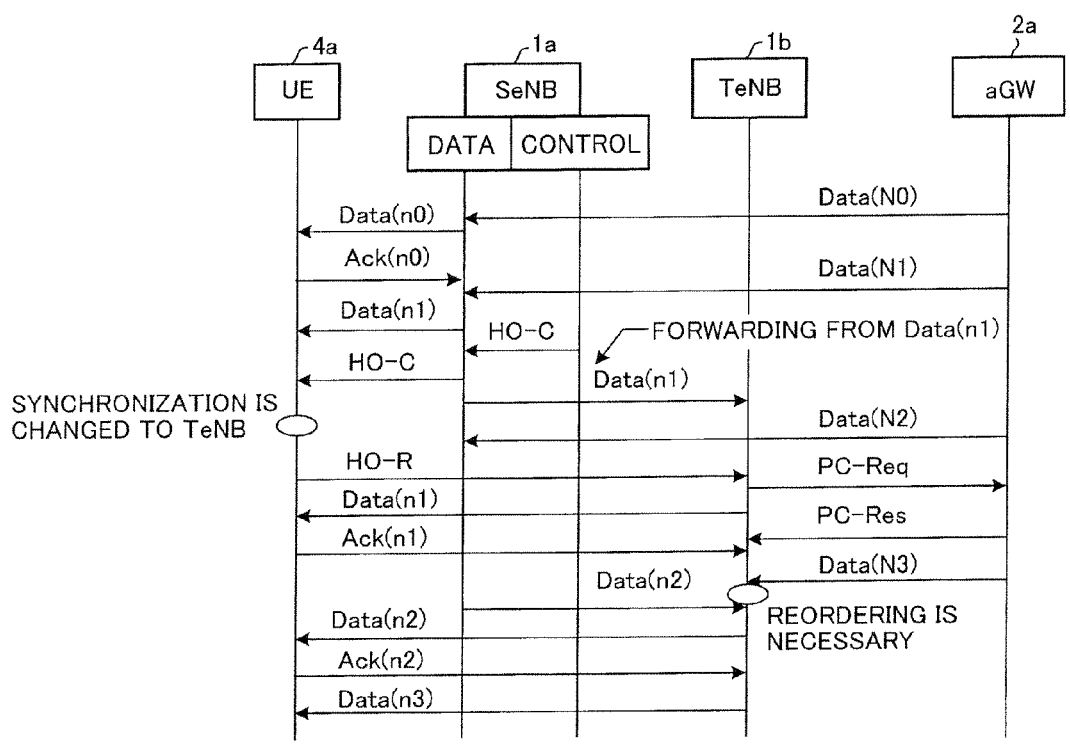
FIG. 26 is a drawing explaining a retransmission control procedure for Downlink data during a handover.
Figure 27:
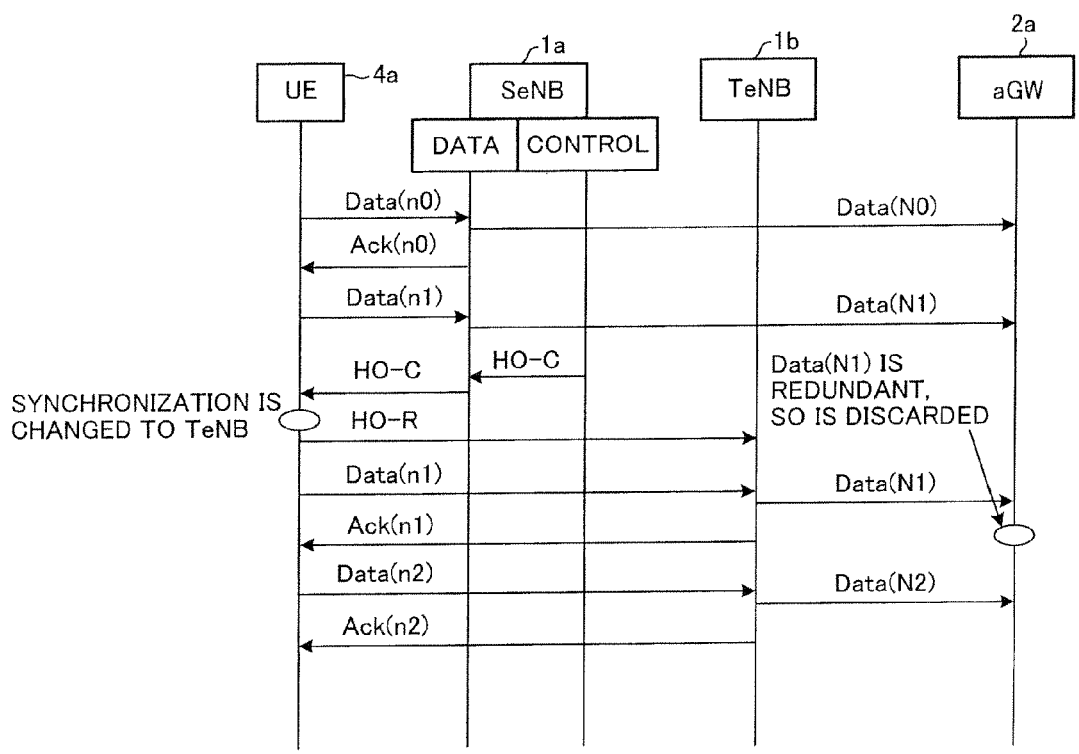
FIG. 27 is a drawing explaining a retransmission control procedure for Uplink data during a handover.
Figure 28:
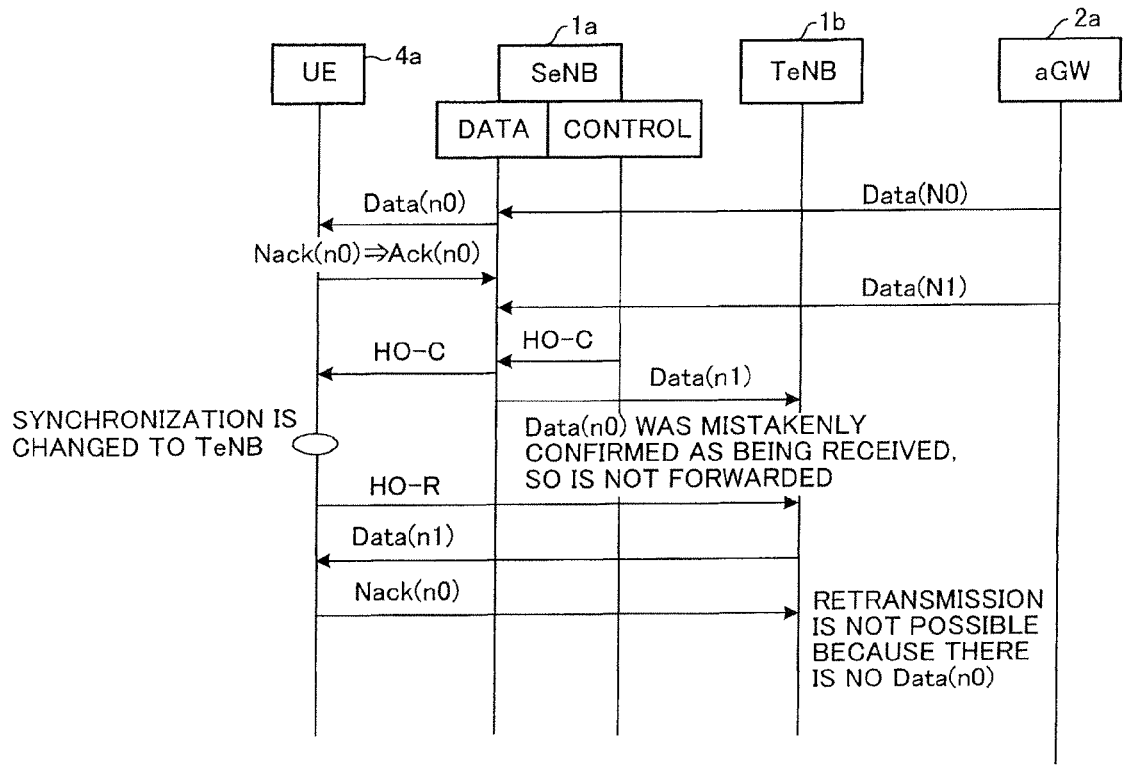
FIG. 28 is a drawing explaining a retransmission control procedure for Downlink data during a handover.
Figure 29:
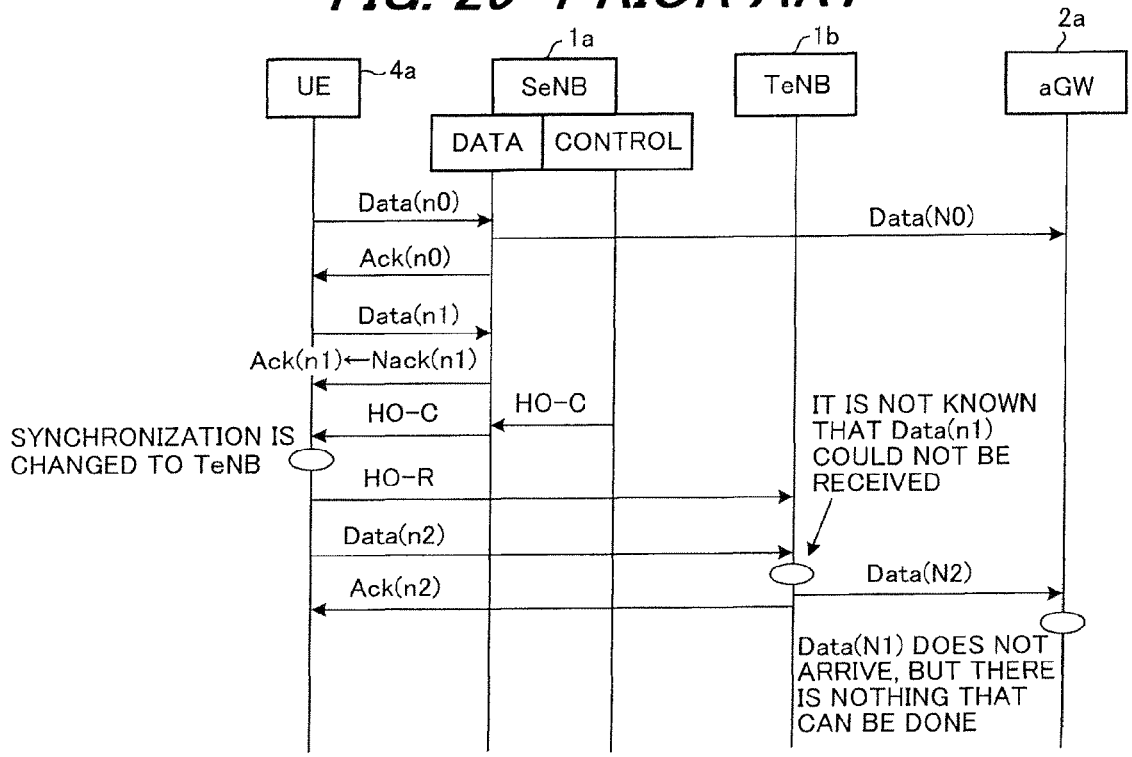
FIG. 29 is a drawing explaining a retransmission control procedure for Uplink data during a handover.

The LTE/SAE system has the protocol stack construction for U-plane Data illustrated in FIG. 21, where communication between a user terminal (UE) 4 and a aGW 2 is performed in the PDCP layer, and communication between a user terminal 4 and base station 1 is performed in the RLC layer.

(B) Data Retransmission Control (a) Data Retransmission Control (Window Size=1)

Figure 4:
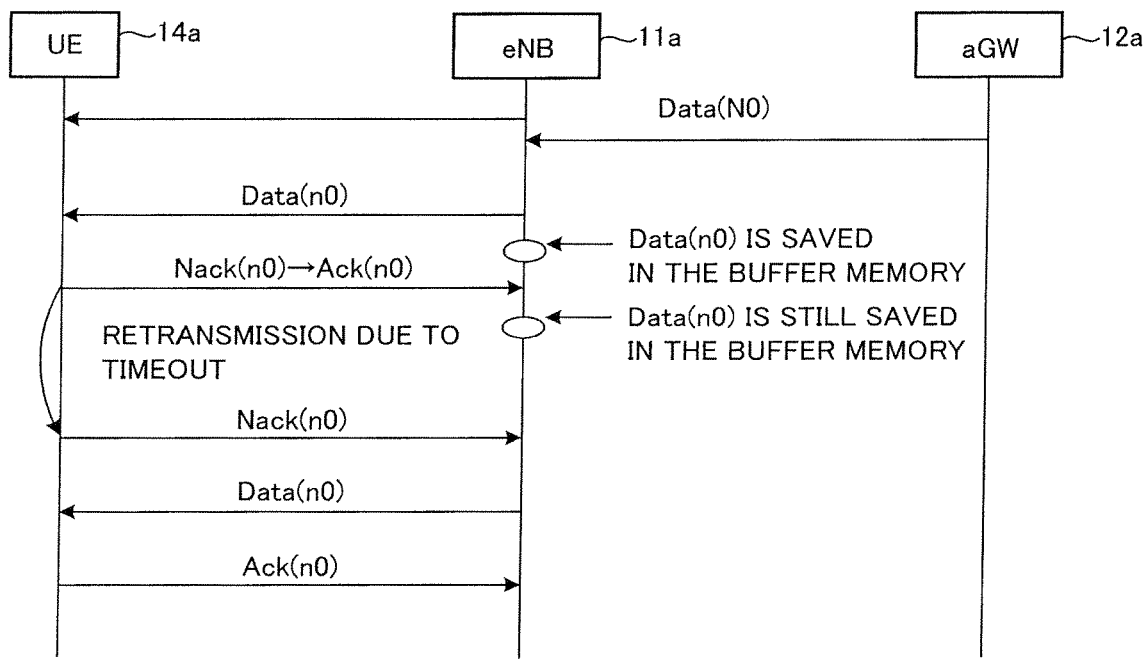
FIG. 4 is a drawing explaining a retransmission control procedure for Downlink data of the present invention.

FIG. 4 is a drawing explaining a retransmission control procedure for Downlink data of the present invention, and is an example in which the window size is 1. In this invention, the base station 11a does not delete Data(ni) from memory even though an Ack(ni) signal is received from the user terminal 14a for Data(ni), and deletes Data(ni) only after receiving an Ack(ni+1) signal for the next data, Data(ni+1).

Normally, as illustrated in FIG. 4, the base station 11a converts Data(N0) that is received from the aGW 12 to Data (n0) in the RLC layer, then together with saving that RLC layer Data(n0) in the buffer memory, sends Data(n0) to the user terminal (UE) 14a. When the user terminal (UE) 14a is not able to properly receive Data(n0), it sends a Nack(n0) signal to the base station 11a. Even though the base station 11a mistakenly detects the Nack(n0) signal as an Ack(n0) signal, it does not delete Data(no) from the buffer memory, but continues to save it. The user terminal 14a monitors the amount of time that elapses after the Nack(n0) signal is sent, and when Data(n0) has not been received after a set amount of time has elapsed, sends a Nack(n0) signal to the base station 11a again. After receiving the Nack(n0) signal, the base station 11a sends Data(n0) that is saved in the buffer memory to the user terminal 14a again. When the user terminal 14a is able to properly receive Data(n0) through this retransmission, it sends an Ack(n0) signal.

In this way, the base station 11a does not delete data even though a Nack signal from the user terminal 14a is mistakenly detected as an Ack signal.

Figure 5:
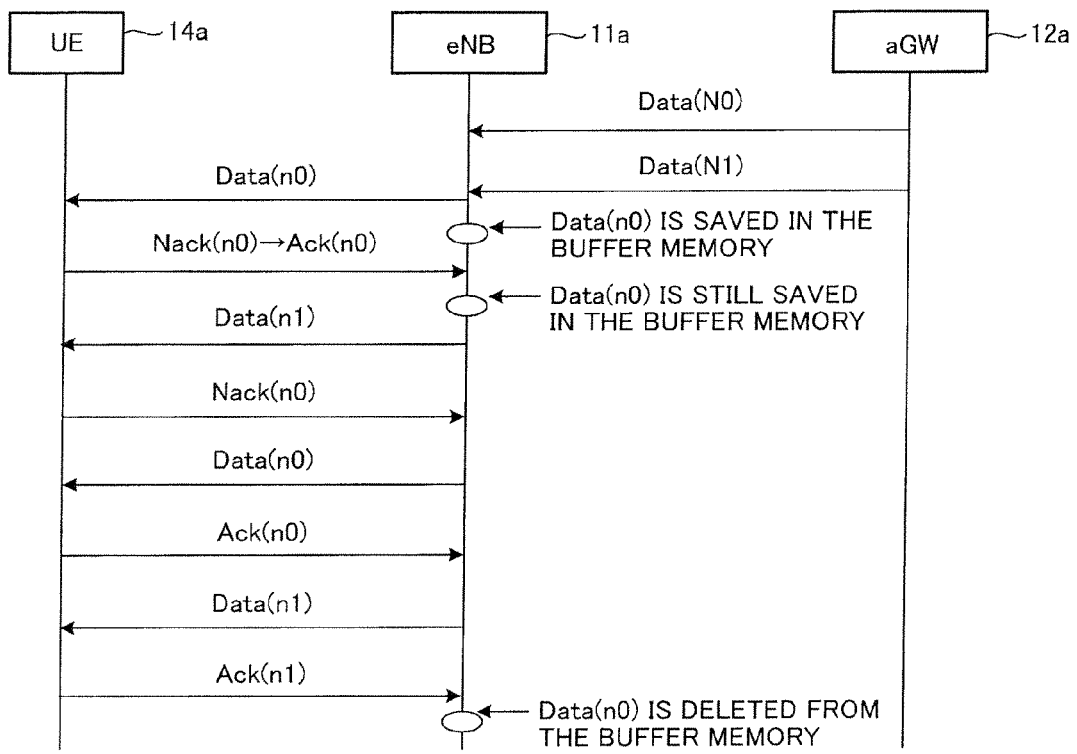
FIG. 5 is a drawing explaining a retransmission control procedure for Downlink data of the present invention that retransmits previous data according to a Nack response.

The explanation above is for the case in which by receiving a retransmission request from the receiving terminal 14a due to a timeout, the base station 11a knows of the retransmission request for the Data(n0) that has not been received. However, it is also possible for the base station 11a to know of the retransmission request for the unreceived Data(n0) by a Nack response from the receiving terminal 14a for the next data, Data(n1). FIG. 5 is a drawing explaining a retransmission control procedure for Downlink data of the present invention that retransmits previous data according to a Nack response for the next data.

The base station 11a does not delete Data(n0) from the buffer memory even though the Nack(n0) signal is mistakenly detected as an Ask(n0) signal, but continues to save that data. Next, the base station 11a sends the next data, Data(n1), to the user terminal 14a, However, the user terminal 14a is waiting to receive Data(n0), and when it receives Data(n1), the user terminal 14a sends the Nack(n0) signal to the base station 11a again. By doing so, the base station 11a knows of the retransmission request for Data(n0), and sends Data(n0) that is saved in memory to the user terminal 14a. After that, the base station 11a sends Data(n1) to the user terminal 14a, and after receiving an Ack(n1) signal from the user terminal 14a, at that point, deletes Data(n0) from the buffer memory.

In this way, the base station 11a does not delete data even though a Nack signal from the user terminal 14a is mistakenly detected as an Ack signal.

(b) Retransmission Control (Window Size=3)

Figure 6:
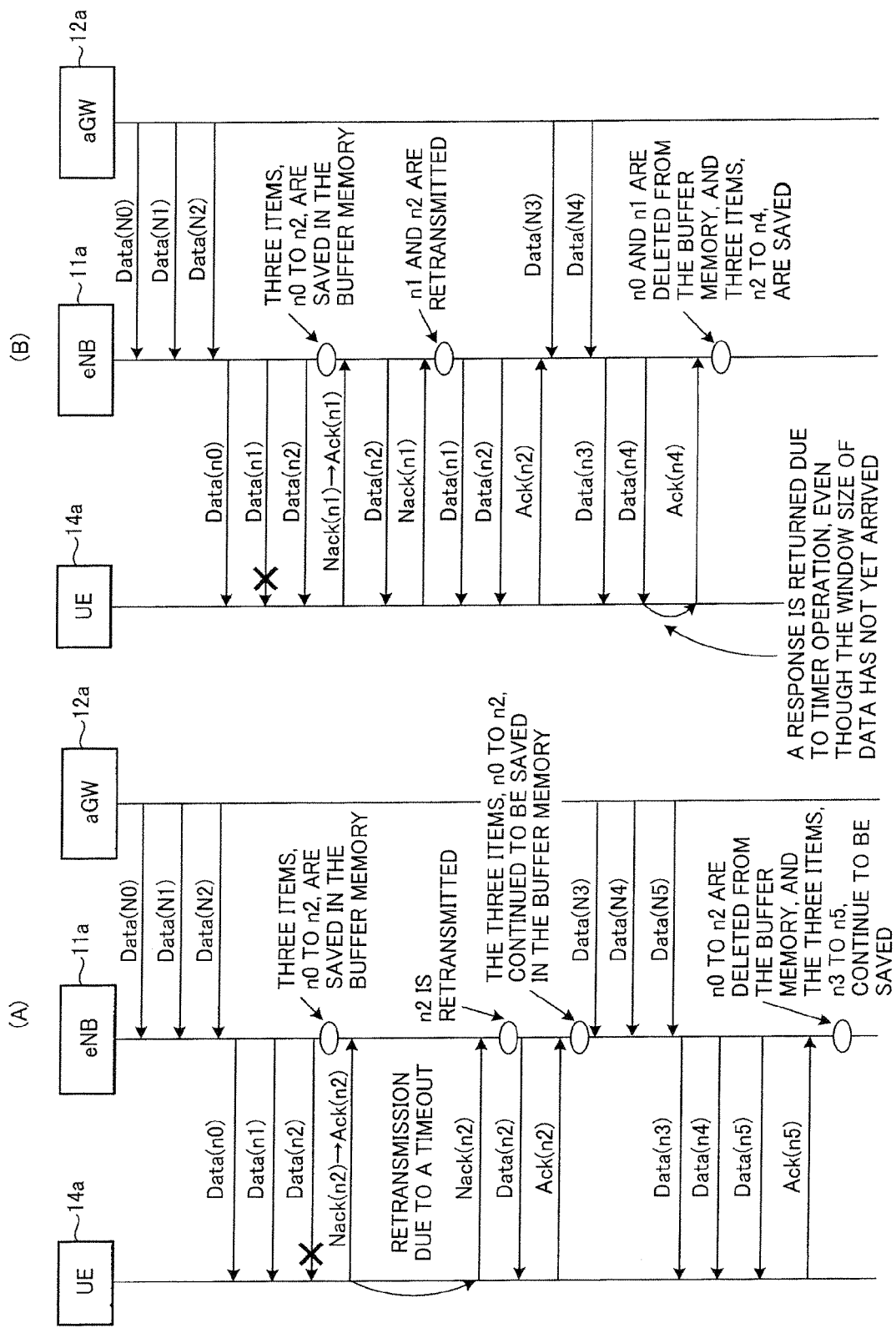
FIG. 6 is a drawing explaining a retransmission control procedure for Downlink data of the present invention.

FIG. 6 is a drawing explaining a retransmission control procedure for Downlink data of the present invention, and is an example in which the window size is 3. In this invention, the base station 11a does not delete a window size of data from memory even though an Ack signal is received for that window size of data, however deletes the previous window size of data after receiving an Ack signal for the next window size of data. An Ack(ni) signal means that data up to sequence number ni has been received properly, and a Nack(ni) signal means that data up to sequence number n−1 has been received properly, however data from sequence number ni on has not been received properly.

Normally, as illustrated in (A) of FIG. 6, the base station 11a converts the Data(N0) to Data(N2) that is received from the aGW 12a to Data(n0) to Data(n2) of the RLC layer, and together with saving that RLC layer data, Data(n0) to Data (n2), in a buffer memory, sends the data to the user terminal (UE) 14a. When the user terminal (UE) 14a is not able to properly receive Data(n2), the user terminal 14a sends a Nack(n2) signal to the base station 11a. The base station 11a does not delete Data(n0) to Data(n2) that is saved in the buffer memory even though the Nack(n2) signal is mistakenly detected as an Ack(n2) signal, and continues to save the data. The user terminal 14a monitors the amount of time that elapses after sending the Nack(n2) signal, and when Data(n2) is not received even after a set amount of time has elapsed, sends the Nack(n2) signal to the base station 11a again. After receiving the Nack(n2) signal, the base station 11a sends Data(n2) that is saved in the buffer memory to the user terminal 14a again. When the user terminal 14a is able to properly receive Data(n2) from this retransmission, it sends an Ack(n2) signal. After that, the base station 11a converts the data, Data(N3) to Data(N5), this is received from the aGW 12a to Data(n3) to Data(n5), and together with saving Data (n3) to Data(n5) in the buffer memory, sends the data to the user terminal (UE) 14a. Moreover, after receiving an Ack(n5) signal from the user terminal 14a, the base station 11a at that point deletes the data, Data(n0) to Data(n2), having sequence numbers before sequence number 2 from the buffer memory, but continues to save Data(n3) to Data(n5).

In this way, the source base station 11a does not delete data even though a Nack signal from the user terminal 14a is mistakenly detected as an Ack signal. The data that is deleted from the buffer memory when an Ack signal is received is data having sequence numbers that are smaller than (S-W), where W is the window size, and S is the sequence number that is attached to the Ack signal.

In (B) of FIG. 6, an example is illustrated in which the user terminal (UE) 14a is not able to properly receive Data(n1), and sends a Nack(n1) signal to the base station 11a, after which the base station 11a mistakenly receives that Nack(n1) signal as an Ack(n1) signal.

By receiving the Ack(n1) signal, the base station 11a recognizes that Data(n2) could not be received properly, so sends Data(n2) to the user terminal 14a again. The user terminal 14a is waiting for Data(n1), however receives Data(n2) instead of Data(n1), so sends a Nack(n1) signal to the base station 11a again. After receiving the Nack(n1) signal, the base station 11a sends Data(n1) and Data(n2) that are saved in memory, after which it sends Data(n3) and Data(n4) in succession to the user terminal 14a. When a set amount of time elapses after receiving the data, even though the window size of data did not arrive, the user terminal 14a sends an Ack(n4) signal to the base station 11a. In so doing, the base station 11a deletes Data(n0) and Data(n1) from the buffer memory, but continues to store Data(n2) to Data(n4).

In this way, when the window size is a plurality of data, the source base station 11a does not delete data even though a Nack signal from the user terminal 14a is mistakenly detected as an Ack signal.

Figure 7:
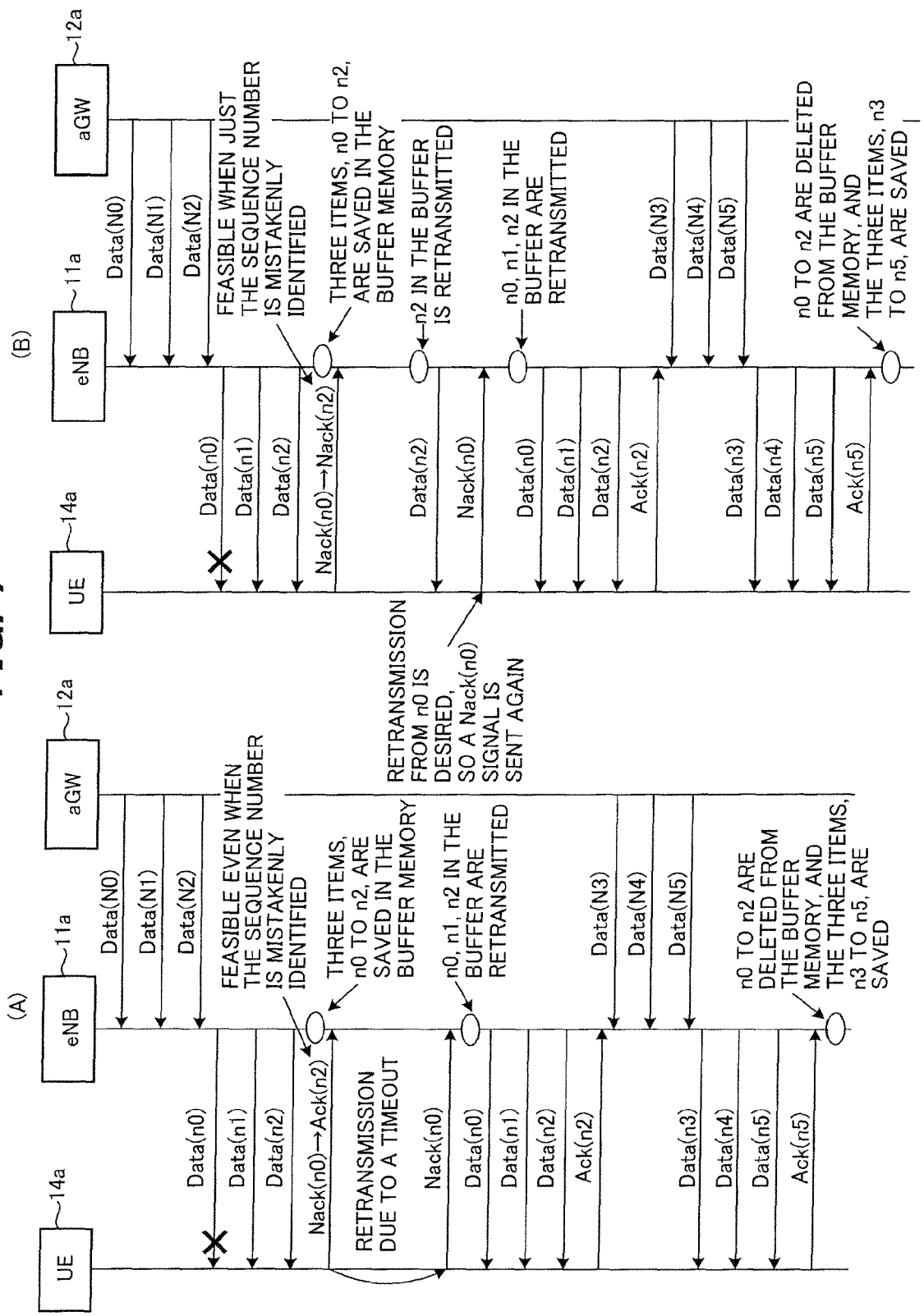
FIG. 7 is a drawing explaining a retransmission control procedure for data when, together with mistakenly receiving a Nack signal as an Ack signal, the sequence numbers are also mistakenly received.

(c) Retransmission Control when the Sequence Number is Mistakenly Received (A) of FIG. 7 is a drawing explaining data transmission control when a Nack signal is mistakenly received as an Ack signal, and the sequence number is also mistakenly received.

When the base station 11a mistakenly receives a Nack(n0) signal as an Ack(n2) signal, it does not send Data(n0) to Data(n2) to the user terminal 14a again. As a result, the user terminal 14a sends the Nack(n0) to the base station 11a again due to a timeout. In so doing, the base station 11a sends Data(n0) to Data(n2) that are saved in the buffer memory to the user terminal 14a again, and after receiving that data properly, the user terminal 14a sends an Ack(n2) signal. After receiving the Ack(n2) signal, the base station 11a converts the data, Data(N3) to Data(N5), that is received from the aGW 12a to Data(n3) to Data(n5), and together with saving Data (n3) to Data(n5) in the buffer memory, sends the data to the user terminal (UE) 14a. Moreover, after receiving an Ack(n5) signal from the user terminal 14a, at that point, the base station 11a deletes the data, Data(n0) to Data(n2), having sequence numbers before the sequence number 2 (=5−3) from the buffer memory, however continues to save Data(n3) to Data(n5).

In (B) of FIG. 7 is illustrated an example in when the base station mistakenly received a Nack(n0) signal as a Nack(n2) signal, where only the sequence number was mistakenly received. In this case, the base station 11a sends Data(n2), however, the user terminal wants data to be sent again starting from Data(n0), so after receiving Data(n2), sends the Nack (n0) signal to the base station again. After doing so, the base station 11a sends Data(n0) to Data(n2) that are saved in the buffer memory to the user terminal 14a, and after receiving the data properly, the user terminal 14a sends an Ack(n2) signal. After receiving the Ack(n2) signal, the base terminal converts the data, Data(N3) to Data(N5) that were received from the aGW 12a to Data(n3) to Data(n5), and together with saving Data(n3) to Data(n5) in the buffer memory, sends the data to the user terminal (UE) 14a. When an Ack(n5) signal is received from the user terminal 14a, at that time the base terminal 11a deletes data, Data(n0) to Data(n2), having sequence number 2 and before from the buffer memory, but continues to save Data(n3) to Data(n5).

In this way, data is not lost even though the source base station 11a mistaken receives a Nack signal from the user terminal 14a as an Ack signal, and also mistakenly receives the sequence number. Moreover, data is not lost even though the source base station 11a only mistakenly receives the sequence number from the user terminal 14a.

Figure 8:
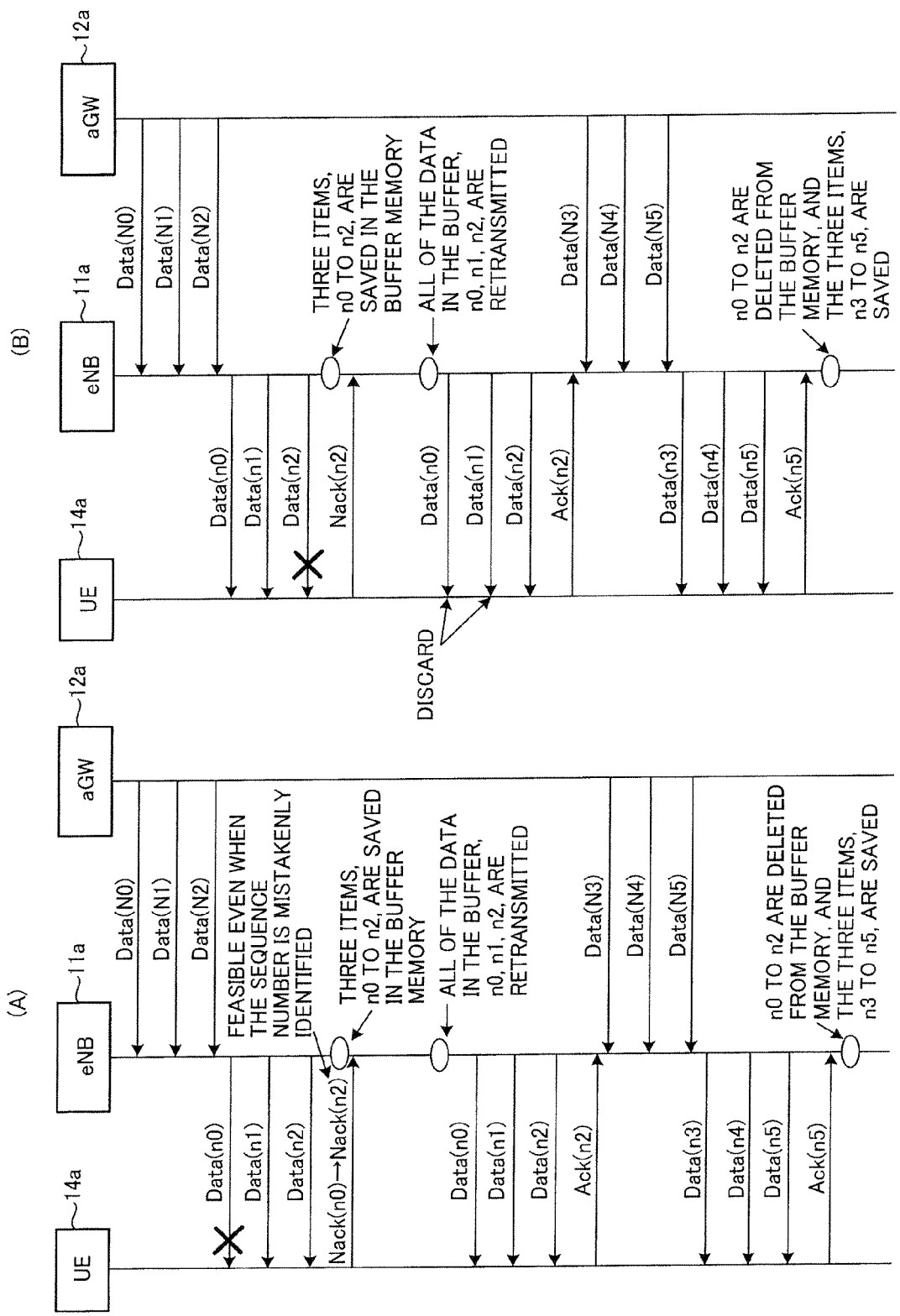
FIG. 8 is a drawing explaining another retransmission control procedure when the sequence numbers are mistakenly received.

(d) Another Retransmission Control Procedure when Sequence Numbers are Mistakenly Received (A) of FIG. 8 is a drawing explaining other retransmission control when sequence numbers are mistakenly received. When a Nack(n0) signal is mistakenly received as a Nack(n2) signal, the base station 11a retransmits all data that is stored in the buffer memory regardless of the sequence number of the Nack signal. In doing so, data is not lost, and Data(n2) is not retransmitted two times as in the case of the control illustrated in (B) of FIG. 7.

(B) of FIG. 8 is drawing explaining transmission control when a Nack(n2) signal is correctly received as a Nack(n2) signal. The base station 11a retransmits all data that is stored in the buffer memory regardless of the sequence number of the Nack signal. In this case, the user terminal 14a redundantly receives Data(n0) and Data(n1), however by discarding these, there is no problem.

Data transmission control for the Downlink direction was explained above using FIG. 4 to FIG. 8, however it is also possible to similarly perform data retransmission control for the Uplink direction.

(C) Retransmission Control in the Downlink Direction During Handover (a) Data Retransmission Control (Window Size=1)

Figure 9:
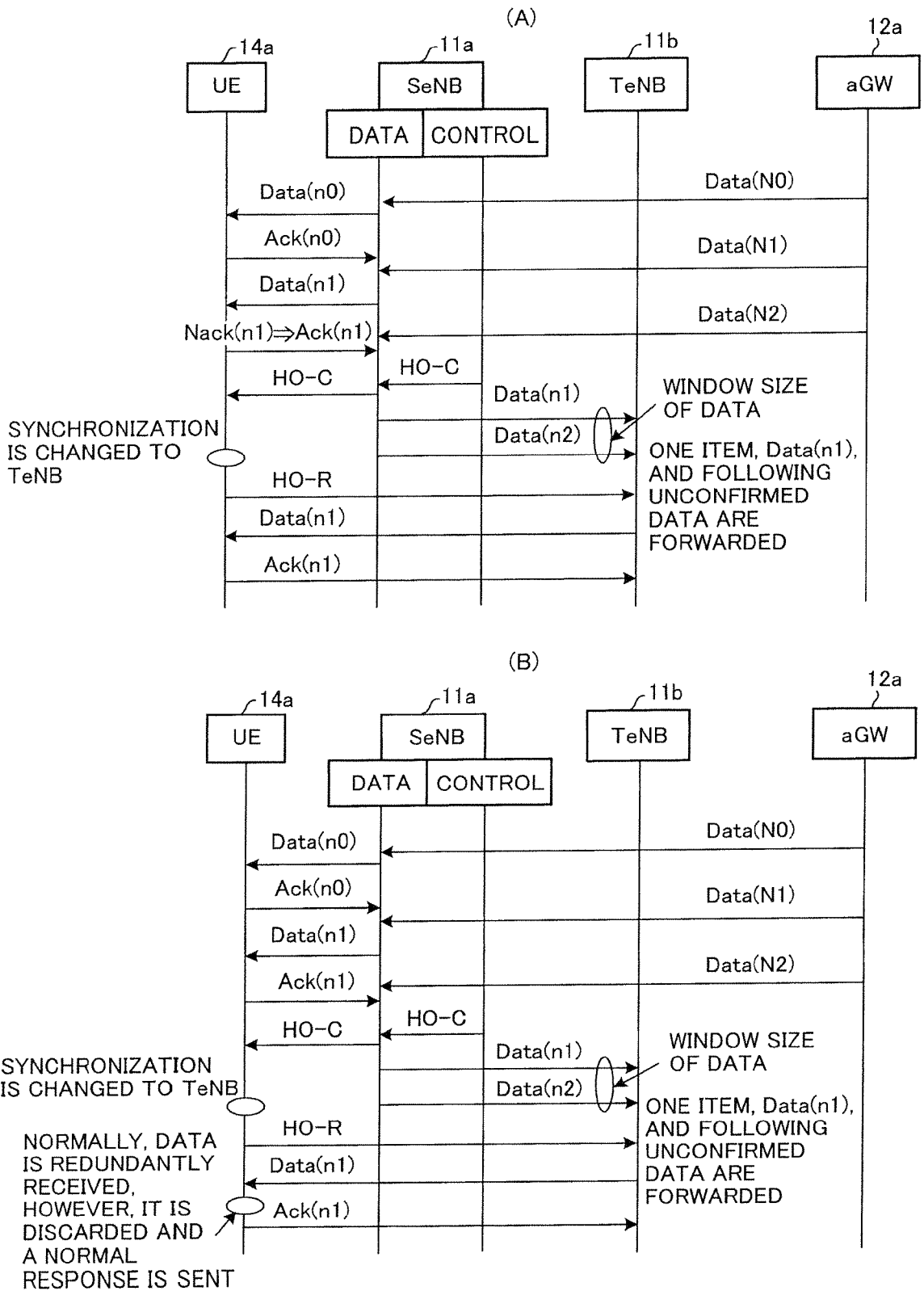
FIG. 9 is a drawing explaining a retransmission control procedure for Downlink data during a handover (when the window size=1).

FIG. 9 is a drawing explaining retransmission control for Downlink data during a handover, and is an example in which the window size is 1. In this invention, the source base station 11a does not delete Data(ni) from memory even though an Ack(ni) signal is received from the user terminal 14a for Data(ni), and deletes Data(ni) only after an Ack(ni+1) signal is received for the next data, Data(ni+1).

(A) of FIG. 9 is a drawing explaining retransmission control when a Nack signal is mistakenly received as an Ack signal. First, data is sent along the path aGW 12→source base station 11a→user terminal 14a. The source base station 11a creates Data(n0) from Data(N0) that was received from the aGW 12a, and sends that Data(n0) to the user terminal 14a, and when the user terminal 14a is able to properly receive Data(n0), it sends an Ack(n0) signal to the source base station 11a. Next, the source base station 11a creates Data(n1) from Data(N1) that was received from the aGW 12a, and sends that Data(n1) to the user terminal 14a. The user terminal 14a is not able to properly receive Data(n1) and sends a Nack(n1) signal, however the source base station 11a mistakenly receives an Ack(n1) signal. Since the source base station 11a mistakenly receives the Nack(n1) signal as an Ack(n1) signal, it deletes the previously received Data(n0) from the buffer memory, however continues to save Data(n1).

At this time, when conditions to start a handover are satisfied based on handover control that is performed at the same time, the source base station 11a sends a H0 Command to the user terminal 14a. Upon receiving this H0 Command, the user terminal 14a immediately begins control to establish synchronization with the target base station 11b. On the other hand, the source base station 11a sequentially forwards all of the data, Data(n1), Data(n2), . . . that was received from the aGW 12a and saved in the buffer memory to the target base station 11b.

After that, when the user terminal 14a uses an H0 Response to notify the target base station 11b that handover is complete, the target base station 11b performs control to change the path to the aGW 12a, after which the aGW is able to directly send data to the target base station 11b starting from Data(N3).

Moreover, after receiving the H0 Response, the target base station 11b sends Data(n1) that was forwarded from the source base station 11a to the user terminal 14a, and when that data is properly received, the user terminal 14a returns an Ack(n1) signal. After that, the target base station 11b sends Data(n2), Data(n3), . . . in order to the user terminal 14a.

In this way, the source base station 11a forwards all of the data saved in the buffer memory to the target base station 11b, and the target base station 11b sends all of the forwarded data to the user terminal 14a, so data is not lost even though the source base station 11a mistakenly receives a Nack signal as an Ack signal.

(B) of FIG. 9 is a drawing explaining normal data transmission control. By performing control as illustrated in (A) of FIG. 9, data that is received before a handover is redundantly sent to the user terminal 14a after the handover, however, by having the user terminal discard the redundantly sent data, there is no problem.

(b) Data Retransmission Control (Window Size=3)

Figure 10:
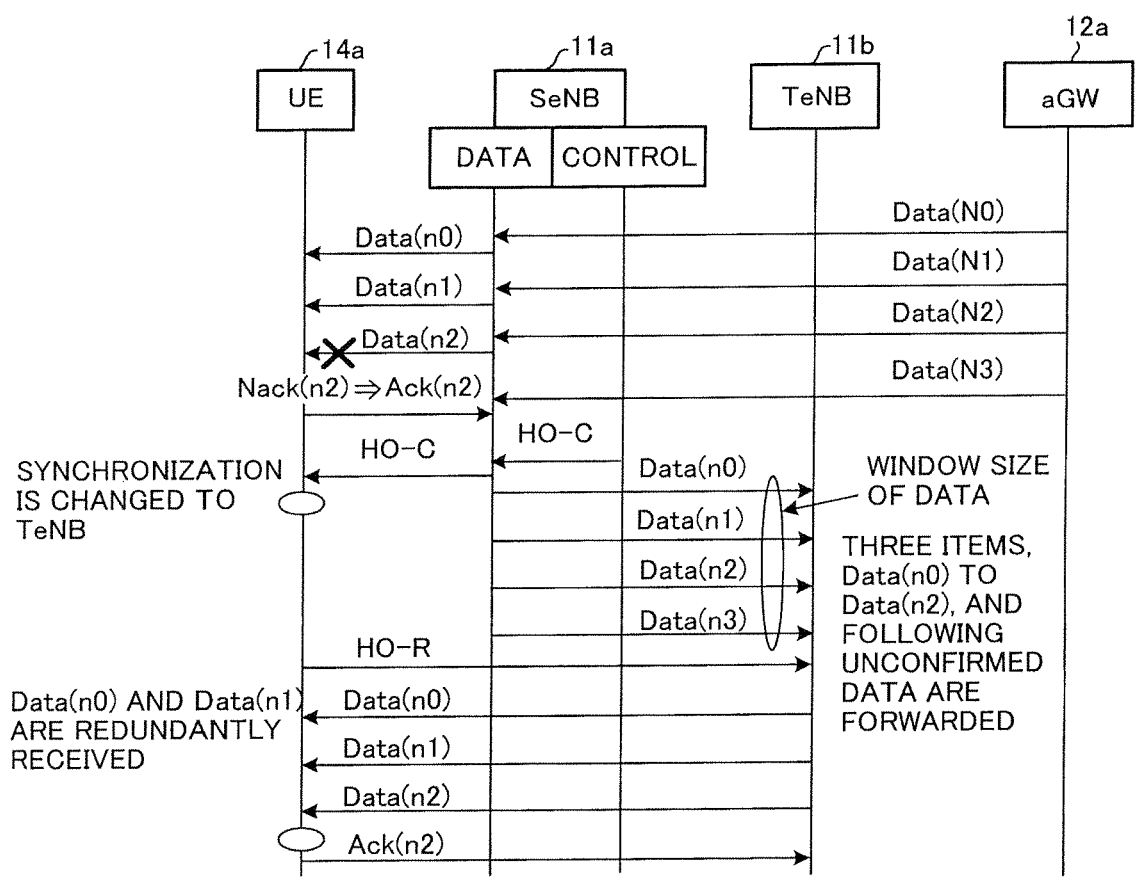
FIG. 10 is a drawing explaining a retransmission control procedure for Downlink data during a handover (when the window size=3).

FIG. 10 is a drawing explaining retransmission control of Downlink data during a handover, and is an example in which the window size is 3. In the present invention, the source base station 11a does not delete an amount of data corresponding to the window size from memory even though an Ack signal for one window size of data is received from the user terminal 14a, and only deletes the previous window size of data after an Ack signal is received for the next window size of data. Here, Ack(ni) means that the data up to sequence number ni were properly received, and Nack(ni) means that data up to sequence number ni−1 were properly received, and data from sequence number ni on were not properly received.

As illustrated in FIG. 10, the base station 11a converts the data, Data(N0) to Data(N2), that are received from the aGW 12a to Data(n0) to Data(n2) for the RLC layer, and together with saving that RLC data, Data(n0) to Data(n2), in the buffer memory, sends the data to the user terminal 14a. When the user terminal 14a is not able to properly receive Data(n2), it sends a Nack(n2) signal to the base station 11a. When the base station 11a mistakenly detects the Nack(n2) signal to be an Ack(n2) signal, it does not send Data(n2) again, but continues to save Data(n0) to Data(n2) in the buffer memory without deleting it.

At that time, when conditions for starting a handover are satisfied based on handover control that is performed at the same time, the source base station 11a sends a H0 Command to the user terminal 14a. Upon receiving the H0 Command, the user terminal 14a immediately begins control for establishing synchronization with the target base station 11b. On the other hand, the source base station 11a forwards the one window size of data, Data(n0), Data(n1) and Data(n2), which is received from the aGW 12a and saved in the buffer memory, and the data received after that, Data(n3), in order to the target base station 11b.

After the user terminal 14a uses an H0 Response to notify the target base station 11b that the handover is completed, the target base station 11b requests the aGW 12a to change the path. Thereby the aGW 12a is able to directly send data to the target base station 11b.

When the target base station 11b receives the H0 Response, it also sends the one window size of data, Data(n0) to Data(n2), that was forwarded from the source base station 11a to the user terminal 14a, and when the user terminal 14a properly receives that data, it returns an Ack(n2) signal. The target base station 11b does not delete Data(n0) to Data(n2) from the buffer memory even though the Ack(n2) is received, but sends Data(n3) to Data(n5) in order to the user terminal 14a, and only after receiving an Ack(n5) signal from the user terminal 14a it deletes Data(n0) to Data(n2) from the buffer memory.

As was explained above, when the window size is taken to be W, the source base station 11a does not delete data having sequence numbers (ni−W+1) to ni from the buffer memory even though an Ack(ni) signal is received from the user terminal 14a, and during a handover, forwards all of the data saved in the buffer memory to the target base station 11b, and that target base station 11b sends all of the forwarded data to the user terminal 14a, so data is not lost during a handover even when the source base station 11a mistakes a Nack signal as an Ack signal.

(c) Data Retransmission Control when the Sequence Number is Mistakenly Received

Figure 11:
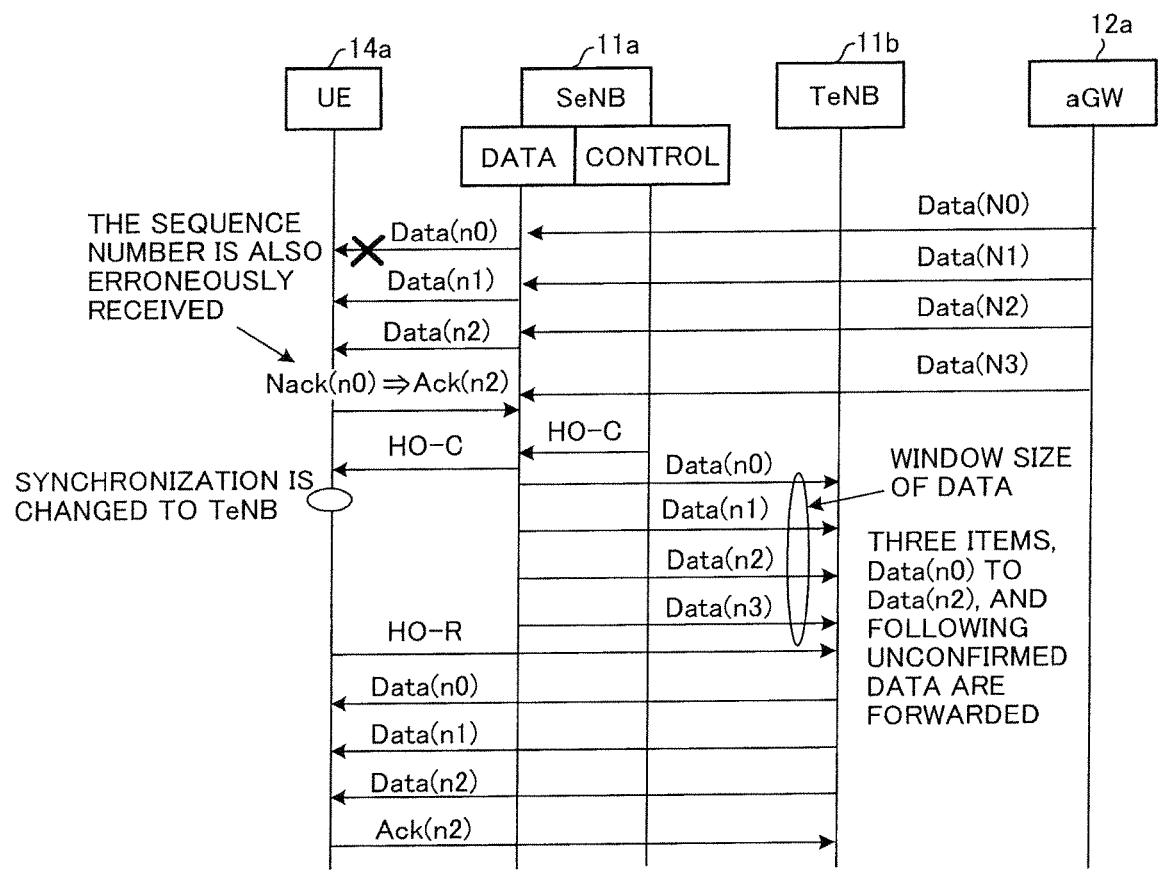
FIG. 11 is a drawing explaining a retransmission control procedure during a handover when, together with mistakenly receiving a Nack signal as an Ack signal, the sequence numbers are also mistakenly received.

FIG. 11 is a drawing explaining data retransmission control during a handover when a Nack signal is mistakenly received as an Ack signal and the sequence number is also mistakenly received (when the window size=3).

As illustrated in FIG. 11, the base station 11a converts the data, Data(N0) to Data(N2), received from the aGW12a to RLC layer data, Data(n0) to Data(n2), and together with saving that RLC layer data, Data(n0) to Data(n2) in the buffer memory, sends that data to the user terminal 14a. When Data(n0) could not be properly received, the user terminal 14a sends a Nack(n0) signal to the base station 11a. When the base station 11a mistakenly detects the Nack(n0) signal as an Ack(n2) signal, the base station 11a does not send Data(n0) to Data(n2) again, but continues to save Data(n0) to Data(n2) in the buffer memory without deleting it.

A this time, when conditions for starting a handover are satisfied based on handover control that is performed at the same time, the source base station 11a sends a H0 command to the user terminal 14a. Upon receiving the H0 Command, the user terminal immediately begins control for establishing synchronization with the target base station 11b. On the other hand, the source base station 11a forwards one window size of data, Data(n0) to Data(n2), which was received from the aGW 12a and saved in the buffer memory, and the data received after that, Data(n3), to the target base station 11b in order.

After the user terminal 14a uses a H0 Response to notify the target base station 1b that the handover is completed, the target base station 11b requests the aGW 12a to change the path. Thereby the aGW 12a is able to directly send data to the target base station 11b.

Moreover, after receiving the H0 Response, the target base station 11b sends the one window size of data, Data(n0) to Data(n2), which was forwarded from the source base station 11a, to the user terminal 14a, and when the user terminal 14a properly receives the data, the user terminal 14a sends an Ack(n2) signal. The target base station 11b does not delete Data(n0) to Data(n2) from the buffer memory even though the Ack(n2) is received, but after that sends Data(n3) to Data(n5) in order to the user terminal 14a, and after receiving an Ack(n5) signal from the user terminal 14a, deletes Data(n0) to Data(n2) from the buffer memory.

In this way, it is possible to prevent the loss of data even though the source base station 11a mistakenly receives a Nack signal as an Ack signal, as well as mistakenly receives the sequence number.

(D) Data Retransmission Control in the Uplink Direction During a Handover (a) Data Retransmission Control (Window Size=1)

Figure 12:
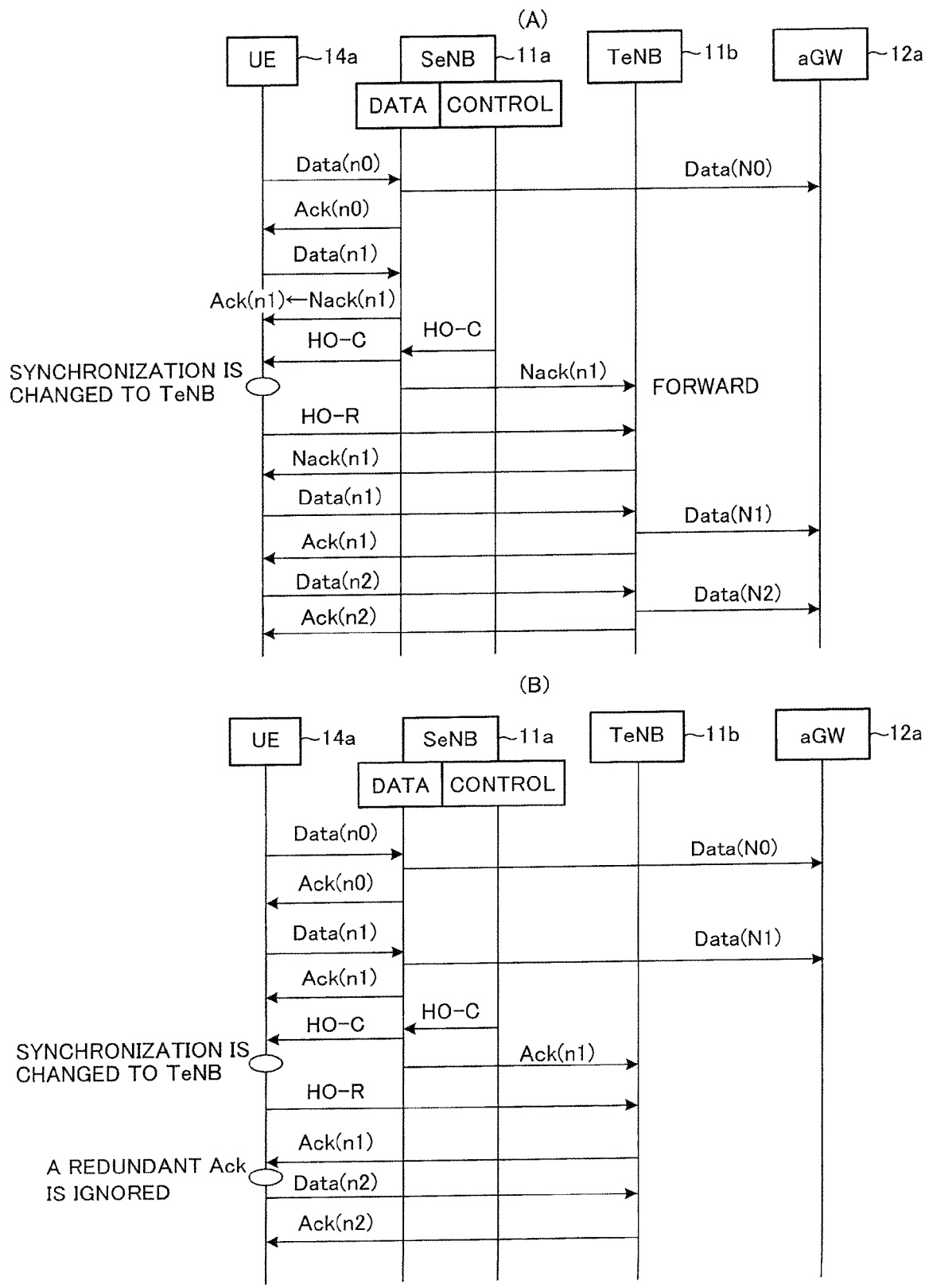
FIG. 12 is a drawing explaining a retransmission control procedure for Uplink data during a handover (when the window size=1).

FIG. 12 is a drawing explaining retransmission control for Uplink data during a handover, and is an example in which the window size is 1. In this invention, the user terminal 14a does not delete Data(ni) from the buffer memory even though an Ack(ni) signal is received from the source base station 11a for Data(ni), and only deletes Data(ni) after an Ack(ni+1) signal is received for the next data, Data(ni+1).

As illustrated in (A) of FIG. 12, data is sent in the Uplink direction along the path user terminal 14a source base station 11a aGW 12a. When the source base station 11a is able to properly receive Data(n0) from the user terminal 14a, it converts Data(n0) to Data(N0), and together with sending the data to the aGW 12a, sends an Ack(n0) signal to the user terminal 14a. However, when the source base station 11a is not able to properly receive the next data, Data(n1), that is sent from the user terminal 14a, the source base station 11a sends a Nack(n1) signal to the user terminal 14a. At this time, when the user terminal 14a mistakenly receives that Nack(n1) signal as an Ack(n1) signal, the user terminal 14a deletes Data(n0) from the buffer memory. However, the user terminal 14a continues to save Data(n1) in the buffer memory.

At that time, when conditions to start a handover are satisfied based on handover control that is performed at the same time, the source base station 11a uses a H0 Command to notify the user terminal 14a of the start of the handover. Upon receiving this H0 Command, the user terminal stops sending data, and immediately begins control for establishing synchronization with the target base station 11b. On the other hand, the source base station 11a forwards the Ack/Nack signal (Nack(n1) in FIG. 12) that was last sent to the user terminal 14a to the target base station 11b.

After synchronization has been established, the user terminal 14a uses a H0 Response to notify the target base station 11b that handover is completed. It is not illustrated in the figure, however, when handover becomes completed, the target base station 11b performs control to change the path to the aGW 12a, after which the target base station 11b is able to directly send data received from the user terminal 14a to the aGW 12a.

Moreover, after receiving the H0 Response, the target base station 11b sends the Nack(ni) signal that was forwarded from the source base station 11a to the user terminal 14a. After receiving the Nack(ni) signal, the user terminal 14a sends Data(n1) to the target base station 11b, After properly receiving Data(n1), the target base station 11b converts Data(n1) to Data(N1), and together with sending that data to the aGW 12a, sends an Ack(n1) signal to the user terminal 14a. After that, the user terminal 14a begins sending data in order to the target base station 11b starting from Data(n2), and after receiving an Ack(n2) signal from the target base station 11b, deletes Data(n1) from the buffer memory.

As described above, after the handover is completed, the target base station 11b sends the Nack signal that the source base station 11a last sent to the user terminal again, so data is not lost even though the user terminal 14a mistakenly receives the Nack signal as an Ack signal.

(B) of FIG. 12 is a drawing explaining normal data transmission control. By performing control as illustrated in (A) of FIG. 12, the Ack signal (Ack(n1) in the figure) that the source base station 11a sent to the user terminal 14a before a handover is redundantly sent by the target base station 11b again after the handover, however, by having the user terminal discard the redundantly received Ack signal, no problem occurs. By so doing it is possible through simple control to prevent data from being lost.

(b) Data Retransmission Control (Window Size=3)

Figure 13:
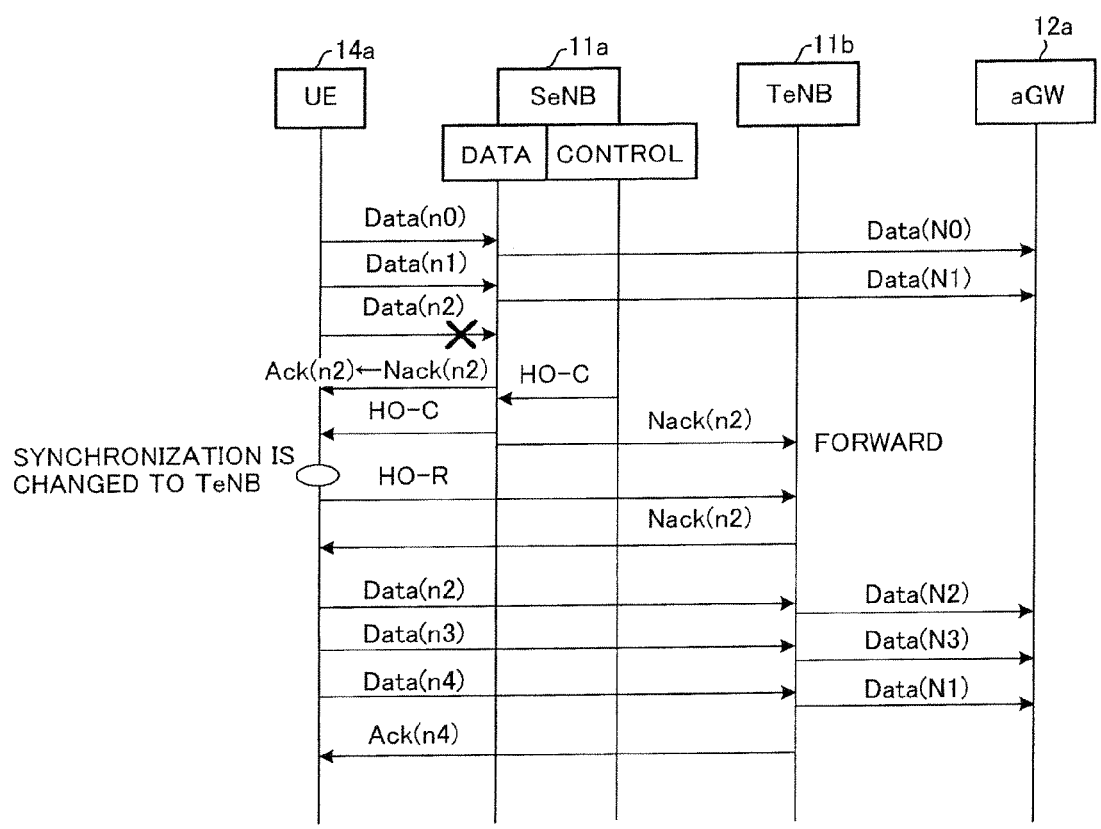
FIG. 13 is a drawing explaining a retransmission control procedure for Uplink data during a handover (when the window size=3).

FIG. 13 is a drawing explaining retransmission control for Uplink data during a handover, and is an example in which the window size is 3. In this invention, the user terminal 14a does not delete a window size of data from the buffer memory even though an Ack signal is received from the source base station 11a for that window size of data, and deletes the previous window size of data only after receiving an Ack signal for the next window size of data.

As illustrated in FIG. 13, data is sent in the Uplink direction along the path user terminal 14a source base station 11a→aGW 12a. When the source base station 11a is able to properly receive Data(n0) and Data(n1) of the window size of data, Data(n0) to Data(n2) that was sent from the user terminal 14a, the source base station 11a converts that data to Data(N0) and Data(N1) and sends the data to the aGW 12a. However, when Data(n2) is not received properly, the source base station 11a sends a Nack(n2) signal to the user terminal 14a. Here, it is supposed that the user 14a mistakenly received the Nack(n2) signal as an Ack(n2) signal.

At that time, when conditions for starting a handover are satisfied based on handover control that is performed at the same time, the source base station 11a uses a H0 Command to notify the user terminal 14a that a handover has begun. Upon receiving this H0 Command, the user terminal 14a immediately stops sending data and begins control to establish synchronization with the target base station 11b. On the other hand, the source base station 11a forwards the Ack/Nack signal (Nack(n2) signal in FIG. 13) that was last sent to the user terminal 14a to the target base station 11b.

After synchronization has been established, the user terminal 14a uses a H0 Response to notify the target base station 11b that handover is completed. After handover is completed, the target base station 11b performs control to change the path to the aGW 12a, after which the target base station 11b is then able to directly send data that was received from the user terminal 14a to the aGW 12a.

Moreover, after receiving the H0 Response, the target base station 11b sends the Nack(n2) signal that was forwarded from the source base station 11a to the user terminal 14a. After receiving the Nack(n2) signal, the user terminal 14a sends the window size of data Data(n2) to Data(n4) that includes Data(n2), to the target base station 11b. When the target base station 11b is able to properly receive Data(n2) to Data(n4), the target base station 11b then converts that Data (n2) to Data(n4) to Data(N2) to Data(N4), and together with sending the data to the aGW 12a, sends an Ack(n4) signal to the user terminal 14a. After receiving the Ack(n4) signal, the user terminal 14a deletes Data(n0) and Data(n1) from the buffer memory, then sends a window size of data in order starting from Data(n5) to the target base station 11b.

As described above, after handover is completed, the target base station 11b resends the Nack signal that the source base station 11a last sent to the user terminal 14a, so data is not lost even when the window size is a plurality of data and the user terminal 14a mistakenly receives a Nack signal as an Ack signal.

(c) Data Retransmission Control when the Sequence Number is Mistakenly Received

Figure 14:
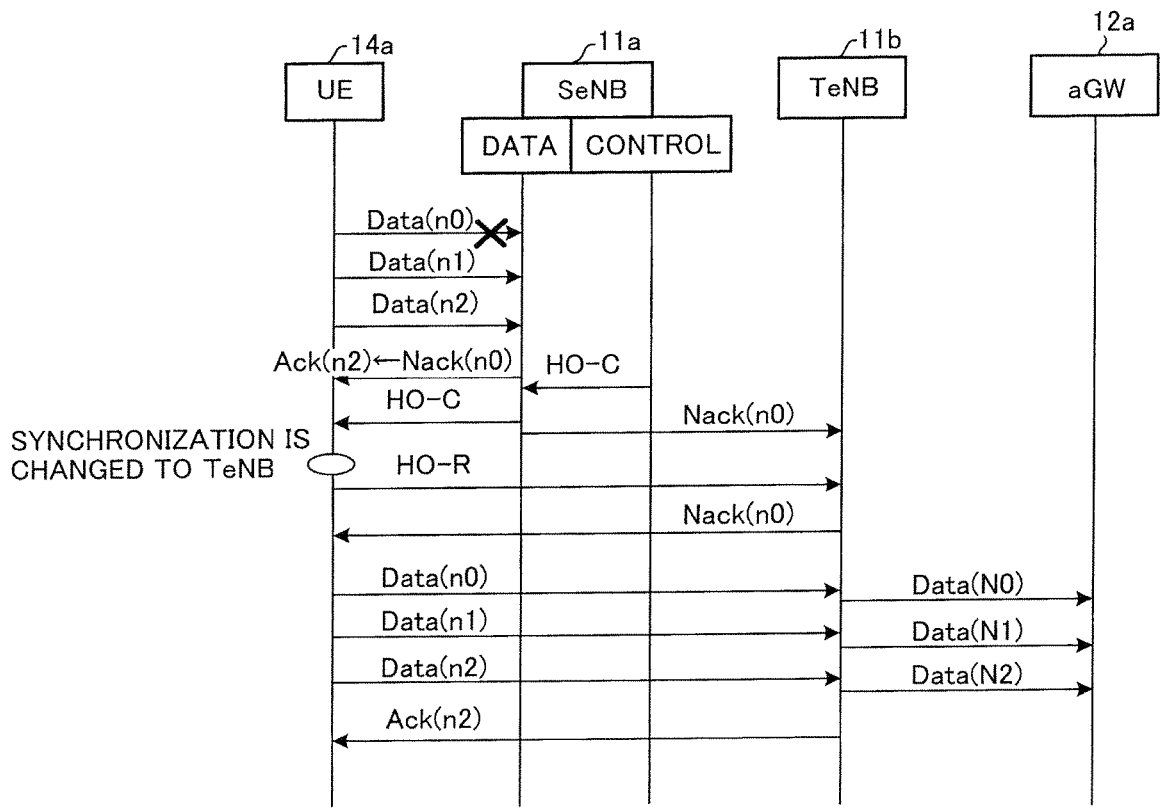
FIG. 14 is a drawing explaining a data retransmission control procedure during a handover when, together with mistakenly receiving a Nack signal as an Ack signal, the sequence numbers are also mistakenly received (when the window size=3).
Figure 15:
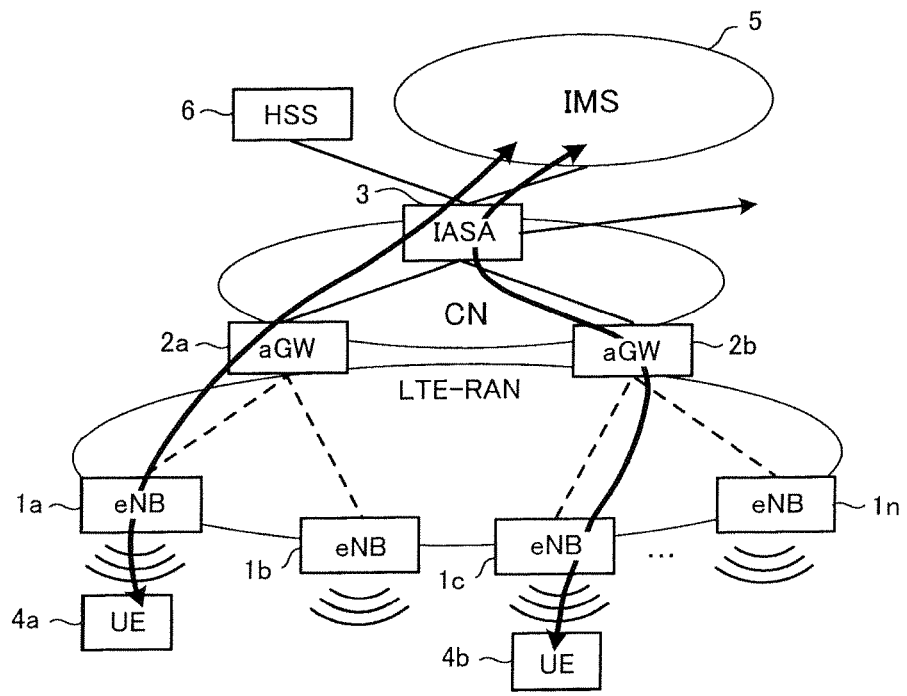
FIG. 15 is a drawing illustrating an example of construction of a LTE/SAE system as a next-generation network system that connects to an IMS.
Figure 16:
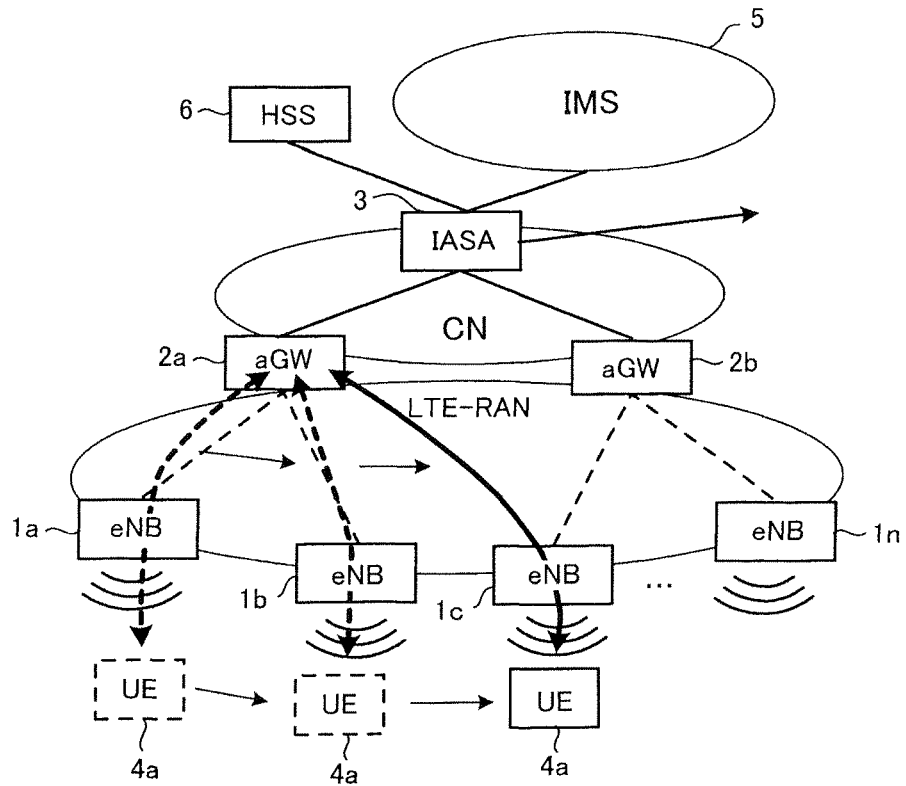
FIG. 16 is a drawing explaining a path during a handover in a LTE/SAE system.
Figure 17:
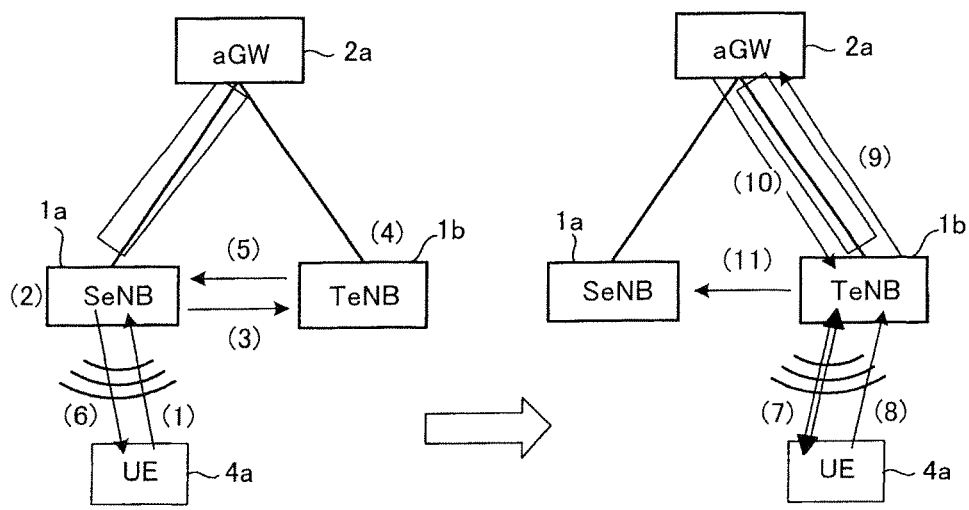
FIG. 17 is a drawing explaining a handover of a LTE/SAE system.
Figure 18:
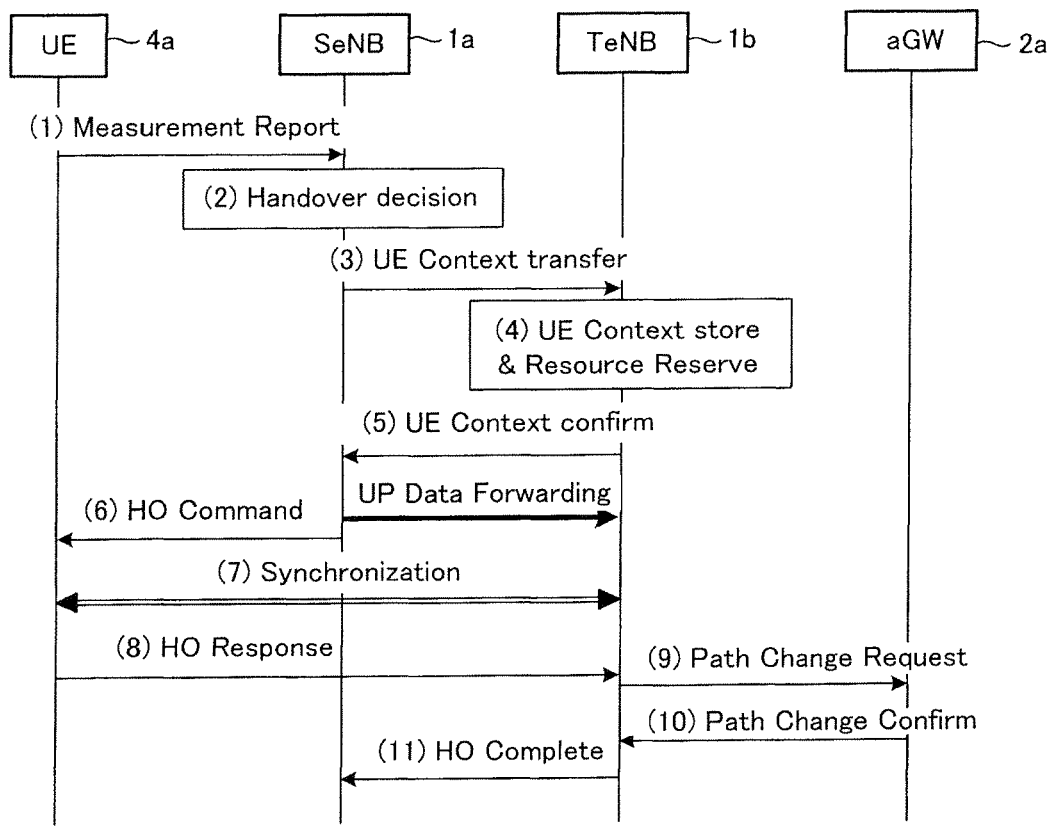
FIG. 18 is a drawing explaining a currently assumed handover control procedure in a LTE/SAE system.
Figure 19:
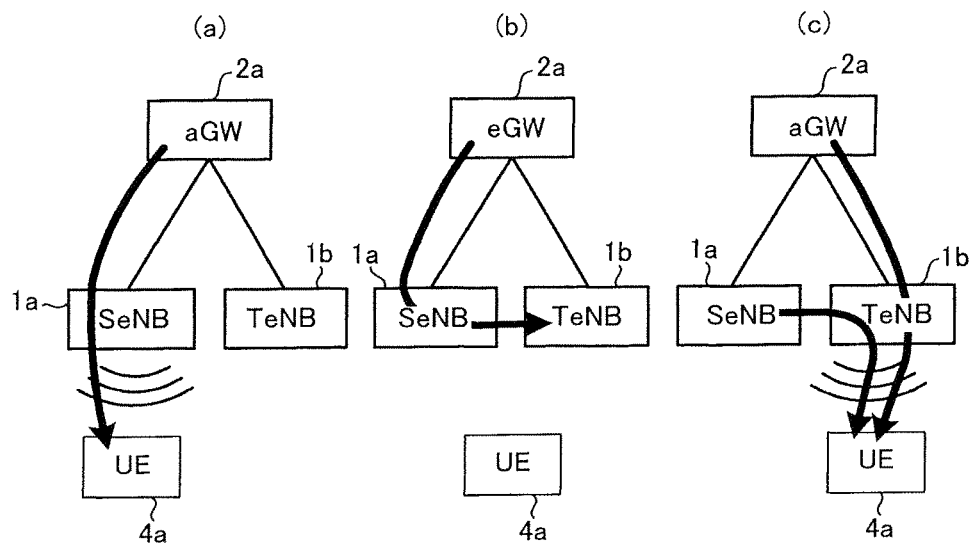
FIG. 19 is a drawing explaining a path change for Downlink data during a handover.
Figure 20:
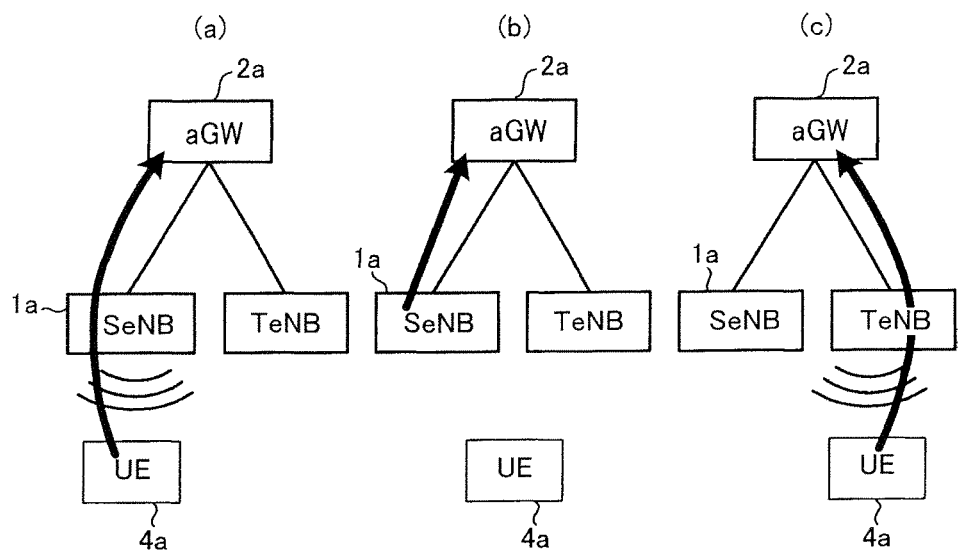
FIG. 20 is a drawing explaining a path change for Uplink data during a handover.

FIG. 14 is a drawing explaining data retransmission control during a handover when a Nack signal is mistakenly received as an Ack signal, and the sequence number is also mistakenly received (window size=3).

As illustrated in FIG. 14, data is sent in the Uplink direction along the path user terminal 14a→source base station 11a→aGW 12a. When the source base station 11a is not able to properly receive Data(n0) from among the window size of data, Data(n0) to Data(n2), the source base station 11a sends a Nack(n0) signal to the user terminal 14a. Here, it is supposed that the user terminal 14a mistakenly received the Nack(n0) signal as an Ack(n2) signal.

At that time, when conditions to start a handover are satisfied based on handover control that is performed at the same time, the source base station 11a uses a H0 Command to notify the user terminal 14a of the start of a handover. Upon receiving the H0 Command, that user terminal 14a stops Sending data and immediately begins control to establish synchronization with the target base station 11b. On the other hand, the source base station forwards the Ack/Nack signal (Nack(n0) signal in FIG. 14) that was last sent to the user terminal 14a to the target base station 11b.

After synchronization is completed, the user terminal 14a uses a H0 Response to notify the target base station 11b that the handover is completed. After the handover is completed, the base station 11b performs control to change the path to the aGW 12a, after which the target base station 11b is able to directly send data that was received from the user terminal 14a to the aGW 12a.

Moreover, after receiving the H0 Response, the target base station 11b sends the Nack(n0) signal that was forwarded from the source base station 11a to the user terminal 14a. After receiving this Nack(n0) signal, the user terminal 14a sends the window size of data, Data(n0) to Data(n2), to the target base station 11b. When the target base station 11b is able to properly receive Data(n0) to Data(n2), the target base station 11b then converts Data(n0) to Data(n2) to Data(N0) to Data(N2), and together with sending that data to the aGW 12a, sends an Ack(n2) signal to the user terminal 14a. After receiving the Ack(n2) signal, the user terminal 14a sends the next window size of data, Data(n3) to Data(n5), in order to the target base station 11b. Moreover, after receiving an Ack(n5) signal from the target base station 11b, the user terminal 14a deletes Data(n0) to Data(n2) from the buffer memory.

As described above, after the handover is completed, by having the target base station 11b retransmit the Ack/Nack signal that the source base station 11a sent last to the user terminal 14a, data is not lost even though the user terminal 14a mistakenly receives a Nack signal as an Ack signal, and also mistakenly receives the sequence number.

Effect

With the invention described above, it is possible, by using a simple scheme, to prevent data from being lost in communication having a retransmission function even when a Nack signal is mistakenly detected as an Ack signal.

Also, with the present invention, it is possible to prevent data from being lost even though a Nack signal is mistakenly detected as an Ack signal, and the sequence number is also mistakenly detected.

Moreover, with the present invention, it is possible to prevent data from being lost in communication having a retransmission function even though a handover begins after a Nack signal is mistakenly detected as an Ack signal.

Furthermore, with the present invention, it is possible to prevent data from being lost even though a handover begins after a Nack signal is mistakenly detected as an Ack signal, and the sequence number is also mistakenly detected.

What is claimed is:

1. A data retransmit method of a data communication system in which a receiving side, after receiving data, sends a transmission confirmation signal (ACK or NACK) to a sending side indicating whether or not the data was received properly, and the sending side makes reference to the transmission confirmation signal to identify that the receiving side did not proper receive the data and retransmits that data, the data retransmit method comprising:
- saving at the sending side, the data sent to the receiving side;
- continuing to save the data previously sent to the receiving side even though the sending side confirms that the data previously sent to the receiving side is received properly by a transmission confirmation signal (ACK) corresponding to the data; and
- retransmitting the saved data to the receiving side when retransmission of the data is requested from the receiving side.

2. A radio base station (evolved-UTRAN NodeB) for communicating with a terminal (UE), the radio base station comprising a memory and a processor configured to:
- store the data (Data[n1]) of RLC (Radio Link Control) layer into the memory;
- transmit the data (Data[n1]) to the terminal (UE);
- detect a transmission confirmation signal (ACK[n1] or NACK[n1]) from the terminal, the transmission confirmation signal (ACK[n1] or NACK[n1]) indicating whether or not the data (Data[n1]) is received properly by the terminal;
- hold the previously transmitted data (Data[n1]) in the memory even after detecting the transmission confirmation signal (ACK[n1]) indicating that the previously transmitted data (Data[n1]) is received properly by the terminal.

3. The radio base station according to claim 2, wherein
the maximum number of items of data that can be transmitted even when the transmission confirmation signal is not received is W,
the sequence number that is attached to the confirmation signal that indicates proper reception is S, and
the processor is configured to delete from the memory data having a sequence number less than S-W.

4. The radio base station according to claim 2, wherein the processor is configured to:
- transmit next data (Data[n2]) of the RLC layer to the terminal in response to detecting the transmission confirmation signal (ACK[n1]) indicating that the data (Data[n1]) is received properly by the terminal;
- hold the data (Data[n1]) and the data (Data[n2]) in the memory even after the transmitting the data (Data[n2]) to the terminal in response to detecting the transmission confirmation signal (ACK[n1]).

5. The radio base station according to claim 2, wherein the processor is configured to:
- transmit a HO (Hand Over) command to the terminal when condition to start a handover is satisfied after detecting the transmission confirmation signal (ACK[n1]) indicating that the data (Data[n1]) is received properly by the terminal;
- forward the data (Data[n1]) held in the memory to a HO target base station.

6. A terminal (UE) for communicating with a radio base station (evolved-UTRAN NodeB), the terminal comprising a memory and a processor configured to:
- store the data (Data[n1]) of RLC (Radio Link Control) layer into the memory;
- transmit the data (Data[n1]) to the radio base station;
- detect a transmission confirmation signal (ACK[n1] or NACK[n1]) from the radio base station, the transmission confirmation signal (ACK[n1] or NACK[n1]) indicating whether or not the data (Data[n1]) is received properly by the radio base station;
- hold the previously transmitted data (Data[n1]) in the memory even after detecting the transmission confirmation signal (ACK[n1]) indicating that the previously transmitted data (Data[n1]) is received properly by the radio base station.

7. The terminal according to claim 6, wherein
the maximum number of items of data that can be transmitted even when the transmission confirmation signal is not received is W,
the sequence number that is attached to the confirmation signal that indicates proper reception is S, and
the processor is configured to delete from the memory data having a sequence number less than S-W.

8. The terminal according to claim 6, wherein the processor is configured to:
- transmit next data (Data[n2]) of the RLC layer to the radio base station in response to detecting the transmission confirmation signal (ACK[n1]) indicating that the data (Data[n1]) is received properly by the radio base station;
- hold the data (Data[n1]) and the data (Data[n2]) in the memory even after the transmitting the data (Data[n2]) to the radio base station in response to detecting the transmission confirmation signal (ACK[n1]).

9. The terminal according to claim 6, wherein the processor is configured to:
- receive a HO (Hand Over) command from the radio base station (HO source base station) in response to transmitting a measurement report that satisfies a condition to start handover;
- forward to a HO target base station the data (Data[n1]) held in the memory even after detecting the transmission confirmation signal (ACK[n1]) indicating that the data (Data[n1]) is received properly by the HO source base station.

* * * * *